United States Patent
Itoh et al.

(10) Patent No.: US 11,007,609 B2
(45) Date of Patent: May 18, 2021

(54) BRAZING SHEET AND MANUFACTURING METHOD THEREOF

(71) Applicant: UACJ Corporation, Tokyo (JP)

(72) Inventors: Yasunaga Itoh, Tokyo (JP); Tomoki Yamayoshi, Aichi (JP)

(73) Assignee: UACJ CORPORATION, Tokyo (JP)

( * ) Notice: Subject to any disclaimer, the term of this patent is extended or adjusted under 35 U.S.C. 154(b) by 72 days.

(21) Appl. No.: 16/463,187

(22) PCT Filed: Jul. 24, 2017

(86) PCT No.: PCT/JP2017/026673
§ 371 (c)(1),
(2) Date: May 22, 2019

(87) PCT Pub. No.: WO2018/100793
PCT Pub. Date: Jun. 7, 2018

(65) Prior Publication Data
US 2020/0061758 A1    Feb. 27, 2020

(30) Foreign Application Priority Data
Nov. 29, 2016 (JP) .............................. JP2016-231382

(51) Int. Cl.
*B23K 35/28* (2006.01)
*B23K 103/10* (2006.01)

(52) U.S. Cl.
CPC ........ *B23K 35/286* (2013.01); *B23K 2103/10* (2018.08)

(58) Field of Classification Search
CPC ............... B23K 35/285; B23K 35/286; B23K 2103/10
USPC ......................................................... 420/529
See application file for complete search history.

(56) References Cited

U.S. PATENT DOCUMENTS

| | | |
|---|---|---|
| 3,807,033 A | 4/1974 | Schoer et al. |
| 3,811,177 A | 5/1974 | Schoer et al. |
| 3,853,547 A | 12/1974 | Singleton |
| 3,900,151 A | 8/1975 | Heinz et al. |
| 4,121,750 A | 10/1978 | Schoer et al. |
| 4,173,302 A | 11/1979 | Schultze et al. |
| 4,241,148 A | 12/1980 | Schoer et al. |

(Continued)

FOREIGN PATENT DOCUMENTS

| | | |
|---|---|---|
| CN | 1416377 A | 5/2003 |
| CN | 1886527 A | 12/2006 |

(Continued)

OTHER PUBLICATIONS

"Aluminum—Magnesium—Silicon (6000) Alloys", published May 2003, found at: http://www.totalmateria.com/Article74.htm.

(Continued)

*Primary Examiner* — Weiping Zhu
(74) *Attorney, Agent, or Firm* — J-Tek Law PLLC; Jeffrey D. Tekanic; Scott T. Wakeman

(57) ABSTRACT

A brazing sheet brazing suitable for brazing performed in an inert gas atmosphere or in a vacuum without using a flux includes a filler layered on a core. The core is composed of an aluminum alloy containing 0.20-1.3 mass % Mg. The filler is composed of an aluminum alloy containing Si: 6.0-13.0 mass % Si, 0.0040-0.070 mass % Bi, and 0.051-0.10 mass % Mg.

20 Claims, 3 Drawing Sheets

(56) References Cited

U.S. PATENT DOCUMENTS

| | | |
|---|---|---|
| 4,626,295 A | 12/1986 | Sasaki et al. |
| 4,645,119 A | 2/1987 | Haramaki et al. |
| 4,905,887 A | 3/1990 | Schoer et al. |
| 4,906,307 A | 3/1990 | Fujiyoshi |
| 4,991,647 A | 2/1991 | Kawabe et al. |
| 5,171,377 A | 12/1992 | Shimizu et al. |
| 5,232,788 A | 8/1993 | Timsit et al. |
| 5,316,206 A | 5/1994 | Syslak et al. |
| 5,418,072 A | 5/1995 | Baldantoni et al. |
| 5,450,666 A | 9/1995 | Conn et al. |
| 6,113,667 A | 9/2000 | Hyogo et al. |
| 6,234,243 B1 | 5/2001 | Murching et al. |
| 6,391,129 B1 | 5/2002 | Hurd et al. |
| 7,926,701 B2 | 4/2011 | Dulac et al. |
| 2001/0040180 A1 | 11/2001 | Wittebrood et al. |
| 2002/0005230 A1 | 1/2002 | Watsuji et al. |
| 2002/0012811 A1 | 1/2002 | Wittebrood et al. |
| 2002/0037425 A1 | 3/2002 | Mooij et al. |
| 2002/0086179 A1 | 7/2002 | Wittebrood |
| 2002/0102431 A1 | 8/2002 | Wittebrood et al. |
| 2003/0051342 A1 | 3/2003 | Hasegawa et al. |
| 2003/0084569 A1 | 5/2003 | Hyogo et al. |
| 2003/0091856 A1 | 5/2003 | Wittebrood |
| 2004/0009358 A1 | 1/2004 | Scott et al. |
| 2004/0028940 A1 | 2/2004 | Toyama et al. |
| 2004/0121180 A1 | 6/2004 | Wittebrood et al. |
| 2004/0238605 A1 | 12/2004 | Nishimura et al. |
| 2005/0006065 A1 | 1/2005 | Katsumata et al. |
| 2005/0011636 A1 | 1/2005 | Miyachi et al. |
| 2005/0076506 A1 | 4/2005 | Kanada |
| 2005/0189047 A1 | 9/2005 | Hasegawa et al. |
| 2006/0000586 A1 | 1/2006 | Katsumata et al. |
| 2006/0102691 A1 | 5/2006 | Toyama et al. |
| 2006/0231170 A1 | 10/2006 | Parson et al. |
| 2007/0017605 A1 | 1/2007 | Nakamura et al. |
| 2007/0158386 A1 | 7/2007 | Dulac et al. |
| 2007/0251091 A1 | 11/2007 | Minami et al. |
| 2008/0003451 A1 | 1/2008 | Suzuki et al. |
| 2008/0047683 A1 | 2/2008 | Takahashi |
| 2009/0165893 A1 | 7/2009 | Akazawa et al. |
| 2009/0233118 A1 | 9/2009 | Katoh et al. |
| 2010/0051247 A1 | 3/2010 | Sogabe et al. |
| 2010/0112370 A1 | 5/2010 | Ueda et al. |
| 2010/0116472 A1 | 5/2010 | Katsumata et al. |
| 2010/0266871 A1 | 10/2010 | Matsuo et al. |
| 2011/0114228 A1 | 5/2011 | Nakamura et al. |
| 2012/0145365 A1 | 6/2012 | Yamashita et al. |
| 2012/0177947 A1 | 7/2012 | Abrahamsson et al. |
| 2013/0118013 A1 | 5/2013 | Yamashita et al. |
| 2013/0299564 A1 | 11/2013 | Steiner et al. |
| 2013/0306714 A1 | 11/2013 | Wittebrood |
| 2014/0186560 A1 | 7/2014 | Katsumata et al. |
| 2014/0329109 A1 | 11/2014 | Takewaka et al. |
| 2015/0037607 A1 | 2/2015 | Itoh et al. |
| 2015/0068713 A1 | 3/2015 | Sucke et al. |
| 2015/0118517 A1 | 4/2015 | Itoh et al. |
| 2015/0165564 A1 | 6/2015 | Ahl et al. |
| 2015/0239071 A1 | 8/2015 | Kiga |
| 2015/0273635 A1 | 10/2015 | Kumagai et al. |
| 2016/0097607 A1 | 4/2016 | Katsumata et al. |
| 2016/0332209 A1 | 11/2016 | Yamashita et al. |
| 2017/0151637 A1* | 6/2017 | Ichikawa ............... B23K 1/19 |
| 2017/0151638 A1 | 6/2017 | Itoh et al. |
| 2017/0205159 A1 | 7/2017 | Yamashita et al. |
| 2017/0205160 A1 | 7/2017 | Yanagawa et al. |
| 2017/0320170 A1 | 11/2017 | Yanagawa et al. |
| 2018/0133845 A1 | 5/2018 | Itoh et al. |

FOREIGN PATENT DOCUMENTS

| | | |
|---|---|---|
| CN | 101871062 A | 10/2010 |
| CN | 102803891 A | 11/2012 |
| DE | 19744734 A1 | 4/1999 |
| DE | 102008009695 A1 | 9/2008 |
| DE | 202012003090 U1 | 4/2012 |
| DE | 102012200828 A1 | 8/2012 |
| EP | 0659519 A1 | 6/1995 |
| EP | 0847830 A2 | 6/1998 |
| EP | 1127653 A2 | 8/2001 |
| EP | 1287934 A1 | 3/2003 |
| EP | 1533070 A1 | 5/2005 |
| EP | 1679146 A1 | 7/2006 |
| EP | 2418042 A1 | 2/2012 |
| EP | 2447662 A1 | 5/2012 |
| EP | 2578344 A1 | 4/2013 |
| EP | 2670559 B1 | 7/2015 |
| EP | 3176273 A1 | 6/2017 |
| JP | S53131253 A | 11/1978 |
| JP | S6182992 A | 4/1986 |
| JP | 61293699 A | 12/1986 |
| JP | H01225736 A | 9/1989 |
| JP | H03124394 A | 5/1991 |
| JP | H03226396 A | 10/1991 |
| JP | H0525576 A | 2/1993 |
| JP | H0775869 A | 3/1995 |
| JP | H0778869 A | 3/1995 |
| JP | H07227695 A | 8/1995 |
| JP | H07303858 A | 11/1995 |
| JP | H0852565 A | 2/1996 |
| JP | H0985433 A | 3/1997 |
| JP | H1034375 A | 2/1998 |
| JP | H1034378 A | 2/1998 |
| JP | H10180489 A | 7/1998 |
| JP | H1180870 A | 3/1999 |
| JP | H11183085 A | 7/1999 |
| JP | H11221696 A | 8/1999 |
| JP | H11285817 A | 10/1999 |
| JP | H11335764 A | 12/1999 |
| JP | H11347783 A | 12/1999 |
| JP | 2000063970 A | 2/2000 |
| JP | 2000167688 A | 6/2000 |
| JP | 2000202620 A | 7/2000 |
| JP | 2000202680 A | 7/2000 |
| JP | 2000225461 A | 8/2000 |
| JP | 3160099 B2 | 4/2001 |
| JP | 3212927 B2 | 9/2001 |
| JP | 2002079370 A | 3/2002 |
| JP | 2002161323 A | 6/2002 |
| JP | 2002267382 A | 9/2002 |
| JP | 200394165 A | 4/2003 |
| JP | 2003126986 A | 5/2003 |
| JP | 2004025297 A | 1/2004 |
| JP | 2004042086 A | 2/2004 |
| JP | 2004076057 A | 3/2004 |
| JP | 2004084060 A | 3/2004 |
| JP | 2004330233 A | 11/2004 |
| JP | 2005060790 A | 3/2005 |
| JP | 2005523163 A | 8/2005 |
| JP | 2005256166 A | 9/2005 |
| JP | 2006043735 A | 2/2006 |
| JP | 2006175500 A | 7/2006 |
| JP | 2006213934 A | 8/2006 |
| JP | 2006255755 A | 9/2006 |
| JP | 2006307292 A | 11/2006 |
| JP | 2006348372 A | 12/2006 |
| JP | 2007031730 A | 2/2007 |
| JP | 2007039753 A | 2/2007 |
| JP | 2007044713 A | 2/2007 |
| JP | 2007512143 A | 5/2007 |
| JP | 2007178062 A | 7/2007 |
| JP | 2007216283 A | 8/2007 |
| JP | 2007260733 A | 10/2007 |
| JP | 2008100283 A | 5/2008 |
| JP | 2008121108 A | 5/2008 |
| JP | 2008208416 A | 9/2008 |
| JP | 2008261025 A | 10/2008 |
| JP | 2009058139 A | 3/2009 |
| JP | 2009058167 A | 3/2009 |
| JP | 2009068083 A | 4/2009 |
| JP | 2009106947 A | 5/2009 |
| JP | 2009142870 A | 7/2009 |
| JP | 2009184017 A | 8/2009 |
| JP | 2010075965 A | 4/2010 |
| JP | 2010075966 A | 4/2010 |

(56) References Cited

FOREIGN PATENT DOCUMENTS

| | | | |
|---|---|---|---|
| JP | 2010247209 A | 11/2010 | |
| JP | 2010255014 A | 11/2010 | |
| JP | 2011000614 A | 1/2011 | |
| JP | 2011136358 A | 7/2011 | |
| JP | 2011247459 A | 12/2011 | |
| JP | 2012067994 A | 4/2012 | |
| JP | 2013189659 A | 9/2013 | |
| JP | 2013233552 A | 11/2013 | |
| JP | 2014050861 A | 3/2014 | |
| JP | 2014083570 A | 5/2014 | |
| JP | 2014226704 A | 12/2014 | |
| JP | 2015030861 A | 2/2015 | |
| JP | 2015528852 A | 10/2015 | |
| WO | 2010147170 A1 | 12/2010 | |
| WO | 2011034496 A2 | 3/2011 | |
| WO | 2012104147 A1 | 8/2012 | |
| WO | 2016017716 A1 | 2/2016 | |
| WO | WO-2016017716 A1 * | 2/2016 | ............. B23K 35/22 |

OTHER PUBLICATIONS

ASM Specialty Handbook—Aluminum and Aluminum Alloys, ASM International, Jun. 2010, pp. 21 and 40-45.
Observation of Third Party filed on Oct. 9, 2018 in counterpart EP application No. 15826433, and claims 1-2 discussed therein.
Discussion of the Relevance of the Observation of Third Party filed on Oct. 9, 2018 Prepared by the European Patent Examiner and posted (made available to the public) on the European Patent Register on Oct. 29, 2018.
Elkem Bremanger, Result Analysis Report for Silgrain 10 micron dated Aug. 20, 2008.
English translation of the International Search Report dated Jun. 7, 2018 for parent application No. PCT/JP2017/026673.
English translation of the Written Opinion of the International Searching Authority in PCT/JP2017/026673.
J.R. Davis, "Aluminum and Aluminum Alloys", Pages from the third edition of ASM Specialty Handbook, ASM International, 1993.
Malvern White Paper entitled "A Basic Guide to Particle Characterization", 2015, webpage found at: http://www.malvern.com/en/support/resource-center/Whitepapers/WP120620BasicGuidePartChar.aspx.
Nocolok® Sil Flux fg brochure, Oct. 2015, webpage found at: http://www.aluminium-brazing.com/sponsor/nocolok/Files/PDFs/31360.pdf.
Communication dated Nov. 13, 2020 in counterpart European Patent Application No. 1 7876 928.7, including examined claims 1-6.
Communication from European Patent Office for related EP application No. 17 876 928.7 dispatched Mar. 30, 2020, including European Search Opinion, Supplementary European Search Report and examined claims 1-12.
Office Action and Search Report from the Chinese Patent Office dispatched Nov. 4, 2020 in related Chinese application No. CN 201780073215, and machine translation thereof.

* cited by examiner

BRAZING SHEET AND MANUFACTURING METHOD THEREOF

CROSS-REFERENCE

This application is the US national stage of International Patent Application No. PCT/JP2017/026673 filed on Jul. 24, 2017, which claims priority to Japanese Patent Application 2016-231382 filed on Nov. 29, 2016.

TECHNICAL FIELD

The present invention relates to a brazing sheet and to a manufacturing method thereof.

BACKGROUND ART

For example, aluminum products, such as a heat exchangers, mechanical parts, and the like, include numerous components composed of aluminum materials (which includes aluminum and aluminum alloys; likewise, below). It is often the case that these components are brazed using a brazing sheet that has a core material and a filler material that is provided on at least one surface of the core material. A flux brazing method is often used as a method of brazing an aluminum material, in which brazing is performed by applying a flux to a surface of a base material, the filler material, or the like at a portion at which an intended joint, i.e., a joint, is to be formed.

However, in flux brazing methods, after the brazing has been completed, flux and the residue thereof adhere to the surface of the aluminum product. The flux, the residue thereof, or the like may cause problems depending on the intended use of the aluminum product. For example, in a heat exchanger equipped with an electronic part, there is a risk that a problem, such as degradation in surface treatability due to flux residue, will occur during the manufacture of the heat exchanger. In addition, for example, in a water-cooled heat exchanger, there is also a risk that a problem will occur, such as clogging caused by the flux or the like in the refrigerant passageways. Furthermore, to remove the flux, the residue thereof, and the like, it is necessary to perform an acid-washing process, and the cost of such a process has been viewed as a problem in recent years.

To avoid the above-mentioned problems attendant with the use of flux, depending on the intended usage of the aluminum product, so-called vacuum brazing methods are also used, in which brazing is performed in a vacuum without the application of flux to the surface of the intended joint. However, vacuum-brazing methods have the problems in that productivity is lower than in flux brazing methods and the quality of the brazed joint tends to deteriorate. In addition, in brazing furnaces used in vacuum brazing methods, the equipment cost, the maintenance cost, and the like are higher than in common brazing furnaces.

Accordingly, so-called fluxless brazing methods have been proposed, in which brazing is performed in an inert gas atmosphere without applying flux to the surface of the intended joint. Brazing sheets used in fluxless brazing methods contain an element or elements, which function(s) to weaken an oxide film or to break down an oxide film, in at least one layer of the layered structure of the brazing sheet. Mg (magnesium) is often used as this type of element.

For example, a brazing sheet for a vacuum brazing method that contains 0.1-5.0 mass % of Mg in the filler material is disclosed in Patent Document 1. In addition, a brazing sheet that contains 0.3-3.0 mass % of Mg in the core material is disclosed in Patent Document 2. Furthermore, a brazing sheet that includes an intermediate material containing 0.1-2.5 mass % of Mg between the core material and the filler material is disclosed in Patent Document 3.

PRIOR ART LITERATURE

Patent Documents

Patent Document 1
Japanese Laid-open Patent Publication 2010-247209
Patent Document 2
Japanese Laid-open Patent Translation No. 2007-512143
Patent Document 3
Japanese Laid-open Patent Translation No. 2015-528852

SUMMARY OF THE INVENTION

However, with regard to the brazing sheet of Patent Document 1, the filler material contains a large amount of Mg, which readily oxidizes. Consequently, when brazing is performed in an inert gas atmosphere using this brazing sheet, there is a risk that, due to a reaction between oxygen contained in the atmosphere in trace amounts and Mg in the filler material, a sturdy oxide film will be formed on the surface of the filler material, which will lead to degradation in brazeability. In addition, at an oxygen concentration in a range that can be achieved by common brazing furnaces, there are problems in that brazing defects often occur, such as fillets being formed discontinuously, fillets scarcely being formed at all, or the like, and in that it is difficult for a joint comprising a continuous fillet to be formed.

With regard to the brazing sheet of Patent Document 2, because Mg is not included in the filler material, it is possible to avoid the above-mentioned degradation in brazeability caused by a filler material containing a large amount of Mg. Incidentally, in this case, during the time period until Mg in the core material reaches the surface of the filler material, weakening of the oxide film due to Mg does not occur. Furthermore, because Mg diffuses within the core material, which is a solid body, and moves to the filler material, a comparatively long time is needed for Mg to arrive at the surface of the filler material. For this reason, with regard to this brazing sheet, for example, if the thickness of the filler material is large, the temperature-rise rate is high, or the like, then there is a risk that the brazing defect described above will occur.

With regard to the brazing sheet of Patent Document 3, the time until Mg reaches the surface of the filler material can be shortened to a certain extent by providing, between the core material and the filler material, an intermediate material that contains Mg. However, because providing the intermediate material increases the number of layers that constitute the brazing sheet, there is a problem in that the materials cost increases.

In addition, in fluxless brazing methods, there has been a problem in the past in that the quality of the brazed joint tends to degrade depending on the shape and structure of the object to be processed and the location at which the brazed joint is formed. For example, if brazing of a hollow structure is performed by using a fluxless brazing method, then there is a risk that the filler produced by the heating will be drawn into the interior of the hollow structure, and therefore a brazing defect will occur on an outer surface of the hollow structure. The current situation is that such problems can not be completely solved even if the brazing sheet of Patent Document 2, Patent Document 3, or the like is used.

The present invention was conceived considering this background and aims to provide: a brazing sheet, in which brazeability when brazing in an inert gas atmosphere is satisfactory and an increase in materials cost can be constrained, as well as a manufacturing method thereof.

One aspect of the present invention is a brazing sheet that is usable in brazing performed in an inert gas atmosphere or in a vacuum without using a flux, comprising:

a core material having a chemical composition that contains Mg (magnesium): 0.20 mass % or more and 1.3 mass % or less, the remainder being Al (aluminum) and unavoidable impurities; and a filler material layered on the core material and having a chemical composition that contains Si (silicon): 6.0 mass % or more and 13.0 mass % or less, Bi (bismuth): 0.0040 mass % or more and 0.070 mass % or less, and Mg: 0.050 mass % or more and less than 0.10 mass %, the remainder being Al and unavoidable impurities.

The brazing sheet comprises the core material, which contains Mg, and the filler material, which contains Si, Mg, and Bi. Because the amount of Mg in the filler material is less than in previously existing brazing sheets used in vacuum-brazing methods, oxidation of the filler material surface during heating when brazing is being performed can be curtailed at the oxygen concentrations attainable in common brazing furnaces. For this reason, in brazing in an inert gas atmosphere, the brazing sheet can curtail degradation in brazeability caused by oxidation of the filler material surface.

In addition, in brazing in an inert gas atmosphere or in brazing in a vacuum, Mg in the filler material rapidly reacts, in the initial stage of brazing, with an oxide film present on the filler material surface. Thereby, the oxide film present on the filler material surface can be weakened before the filler material melts.

Thus, in the brazing sheet, the amount of Mg in the filler material is set to an optimal range such that, while curtailing oxidation of the filler material surface during brazing in an inert gas atmosphere, the oxide film on the filler material surface can be weakened in the initial stage of brazing.

As the brazing progresses, some of the Mg in the core material diffuses and moves into the filler material, and thereby the amount of Mg in the filler material gradually increases. Furthermore, when the filler material melts, Mg in the filler reaches the surface of the filler all at once. At this time, because the oxide film present on the surface of the filler material was weakened in the initial stage of the brazing, the oxide film is rapidly broken down by the filler that now contains a large amount of Mg diffused from the core material. As a result, it becomes easy for a fillet to be formed with the opposing material. Furthermore, Bi, which has the effect of increasing the fluidity of the filler, is included in the filler material.

Consequently, owing to the synergistic effect between the effect of the weakening of the oxide film in the initial stage of the brazing and the effect of improving the fluidity of the filler material caused by Bi, the molten filler rapidly wets the intended joint between the brazing sheet and the opposing material. Furthermore, owing to the fact that a large amount of Mg, which has moved from the core material into the filler material, breaks down the oxide film present on the intended joint all at once, a joint comprising a satisfactory fillet can be rapidly formed.

In addition, as described above, because the oxide film on the filler material surface is weakened before the filler material melts, the molten filler can form the fillet rapidly. Furthermore, because fluidity increases owing to the Bi added into the filler material, the filler tends to collect at the intended joint. Thereby, a sufficient amount of filler is supplied to a location at which the formation of a fillet was difficult for previously existing brazing sheets, such as, for example, on the outer surface of a hollow structure, and thereby a joint comprising a satisfactory fillet can be rapidly formed.

As a result of the above, according to the brazing sheet, a sufficient amount of filler is supplied to the intended joint that joins to an opposing material, and thereby a joint comprising a satisfactory fillet can be rapidly formed. In addition, because the brazing sheet does not need to be provided with an intermediate material between the core material and the filler material, an increase in materials cost can be constrained.

DETAILED DESCRIPTION

Figure 1:
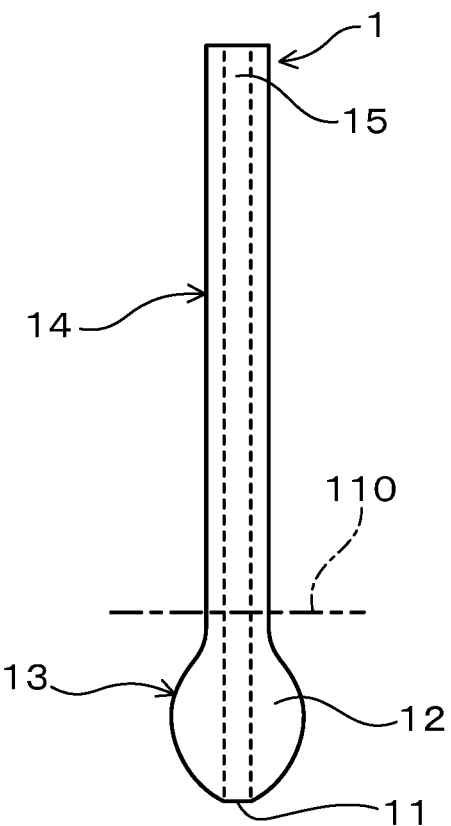
FIG. 1 is side view of a test specimen after heating in Test Example 1.

In the above-mentioned brazing sheet, the filler material may be layered on only one surface of a core material or may be layered on both surfaces. If the filler material is layered on one surface of the core material, then filler material, sacrificial anode material, or the like, which are well known, may be provided on the surface that is on the side of the core material that does not have the filler material. In addition, if the filler material is layered on both surfaces of the core material, then the one filler material and the other filler material may have the same chemical composition or may have chemical compositions that differ from one another.

The chemical composition of each layer constituting the brazing sheet and the reasons for restrictions thereof are explained below.

Core Material

Mg (Magnesium): 0.20 Mass % or More and 1.3 Mass % or Less

Some of the Mg in the core material moves into the filler during heating when brazing is being performed, as described above. By setting the amount of Mg in the core material in the above-mentioned specified range, a sufficient amount of Mg is supplied into the filler, and an oxide film present on an intended joint can be sufficiently broken down. Furthermore, owing to the existence of both Mg and Bi within the filler, these elements function synergistically and provide functions and effects in which the formation speed of the fillet is improved. As a result, a joint comprising a satisfactory fillet can be formed.

If the amount of Mg in the core material is less than 0.20 mass %, then there is a risk that the oxide film will not be sufficiently broken down and thereby a brazing defect, such as the fillet being formed discontinuously, will occur. On the other hand, if the amount of Mg in the core material is greater than 1.3 mass %, then there is a risk that molten filler will permeate into the core material and therefore the amount of filler supplied to the intended joint will be insufficient, or that the contact angle of the filler with respect to an aluminum material will become excessively small. As a result, there is a risk that it will become difficult to form the fillet.

The amount of Mg in the core material preferably is less than 1.0 mass %. In this case, ductility can be further increased when manufacturing the core material or when manufacturing the brazing sheet. In addition, by setting the amount of Mg in the core material to less than 1.0 mass %, the heating conditions during brazing can be selected from broader ranges.

In addition to the essentially-included Mg, the core material may optionally contain other elements. Mn (manganese), Si (silicon), Fe (iron), Cu (copper), Ti (titanium), Zr (zirconium), Cr (chrome), Zn (zinc), In (indium), Sn (tin), and the like are examples of elements that may be included in the core material.

Mn: 0.30 Mass % or More and 2.0 Mass % or Less

The core material may further contain Mn. By setting the amount of Mn in the core material to 0.30 mass % or more, the strength of the core material can be further increased. In addition, in this case, corrosion resistance of the aluminum product can be further improved by adjusting the electric potential of the core material to a suitable range.

However, if the amount of Mn in the core material is excessively large, then there is a risk that cracks will tend to occur during the manufacture of the core material, of the brazing sheet, or the like. From the viewpoint of avoiding such problems, it is preferable to set the amount of Mn in the core material to 2.0 mass % or less.

Si: 0.30 Mass % or More and 1.0 Mass % or Less

The core material may further contain Si. By setting the amount of Si in the core material to 0.30 mass % or more, the strength of the core material can be further increased. In addition, if Si and Mn both exist in the core material, then the strength of the core material can be further increased.

However, if the amount of Si in the core material is excessively large, then there is a risk that the melting point of the core material will be excessively low and brazeability will be adversely affected. From the viewpoint of avoiding such problems, it is preferable to set the amount of Si in the core material to 1.0 mass % or less.

Fe: Less Than 1.0 Mass %

The core material may further contain Fe. Fe in the core material is effective for increasing the strength of the core material. However, if the Fe content becomes excessively large, then there is a risk that it will lead to degradation in corrosion resistance. In addition, in this case, there is also a risk that coarse precipitates that include Fe will be produced in the core material, which will lead to a decrease in ductility. By setting the amount of Fe in the core material to less than 1.0 mass %, these problems can be avoided while at the same time the effect of increasing the strength can be obtained.

Cu: 1.0 Mass % or Less

The core material may further contain Cu. Cu in the core material is effective for increasing the strength of the core material and adjusting the electric potential of the core material. However, if the Cu content becomes excessively large, then there is a risk that the melting point of the core material will decrease, which will lead to degradation in brazeability. In addition, in this case, there is a risk that intergranular corrosion will tend to occur. By setting the amount of Cu in the core material to 1.0 mass % or less, these problems can be avoided while at the same time the effect of increasing the strength can be obtained.

Ti: Less Than 0.10 Mass %

The core material may further contain Ti. Corrosion tends to progress in layers in a core material containing Ti. For that reason, by adding Ti to the core material, the formation of through holes in the core material owing to corrosion can be impeded for a longer time. However, if the Ti content becomes excessively large, then there is a risk that coarse precipitates will occur in the core material, which will lead to a decrease in ductility. By setting the amount of Ti in the core material to less than 0.10 mass %, these problems can be avoided while at the same time the formation of through holes in the core material owing to corrosion can be impeded for a longer time.

Zr: Less Than 0.30 Mass %, Cr: Less Than 0.30 Mass %

The core material may further contain one or two from among these elements. These elements are effective in controlling crystal grain size. However, if the content of Zr or Cr becomes excessively large, cracks will tend to occur during the manufacture of the core material, of the brazing sheet, or the like. In addition, in this case, there is a risk that it will lead to a decrease in ductility. By setting the amount of Zr and the amount of Cr in the core material in the above-mentioned specified ranges, these problems can be avoided while at the same time the functions and effects described above can be obtained.

Zn: 0.10 Mass % or More and 3.0 Mass % or Less, In: 0.010 Mass % or More and 0.10 Mass % or Less, Sn: 0.010 Mass % or More and 0.10 Mass % or Less The core material may further contain one or two or more from among these elements. These elements function to reduce the electric potential of the core material. For this reason, by setting the content of these elements in the above-mentioned specified ranges, the core material can be caused to function as a sacrificial anode material. As a result, corrosion of the aluminum product can be impeded for a longer time.

If the content of any one of Zn, In, or Sn is greater than the above-mentioned respective specified ranges, then there is a risk that the electric potential of the core material will become excessively low, and it will become difficult to maintain the sacrificial corrosion-protection effect over the long term. In addition, in this case, there is a risk that the melting point of the core material will become excessively low, which will lead to degradation in brazeability.

If the brazing sheet is used in brazing in a vacuum, then it is preferable to add one or two from among In and Sn to the core material. Because In and Sn tend not to evaporate during heating when brazing is being performed in a vacuum, they tend to remain in the aluminum product after brazing. For this reason, the functions and effects described above can be more reliably exhibited. It is noted that if the brazing sheet is used in brazing in an inert gas atmosphere, then the functions and effects described above can be exhibited even if any of these elements are used.

Filler Material

Si: 6.0 Mass % or More and 13.0 Mass % or Less

By setting the Si content in the filler material in the above-mentioned specified range, a sufficient amount of filler can be supplied to the intended joint and thereby a satisfactory fillet can be formed. If the amount of Si is less than 6.0 mass %, then there is a risk that problems will occur, such as the amount of filler being insufficient or the fluidity of the filler decreasing.

If the amount of Si is greater than 13.0 mass %, then there is a risk that problems will occur, such as the melted amount of the core material will become excessively large during heating when brazing is being performed, coarse primary phase of Si will tend to be formed in the filler material, or the like, and that melt holes will tend to be produced in the core material during heating when brazing is being performed. In addition, in this case, there is a risk that cracks will occur during hot rolling of the filler material, of the brazing sheet, or the like.

Mg: 0.050 Mass % or More and Less Than 0.10 Mass %

By setting the amount of Mg in the filler material in the above-mentioned specified range, the oxide film present on the filler material surface before melting of the filler can be weakened while oxidation of the filler material surface can be curtailed, as described above. Furthermore, owing to the existence of both Mg and Bi in the filler material, these elements function synergistically, and thereby functions and effects are provided in which the formation speed of the fillet is improved. As a result, a joint provided with a satisfactory fillet can be rapidly formed.

If the amount of Mg in the filler material is less than 0.050 mass %, then there is a risk that the effect of weakening the oxide film will become insufficient, thereby leading to a degradation in brazeability. If the amount of Mg in the filler material is 0.10 mass % or more, then there is a risk that a sturdy oxide film will be formed on the surface of the filler material during heating when brazing is being performed, which will lead to a degradation in brazeability.

Bi: 0.0040 Mass % or More and 0.070 Mass % or Less

By setting the amount of Bi in the filler material in the above-mentioned specified range, the surface tension of the filler can be reduced, and the fluidity of the filler can be increased. Furthermore, owing to the coexistence of Mg and Bi in the filler material, these elements function synergistically and thus functions and effects are provided in which the formation speed of the fillet is improved. As a result, a joint provided with a satisfactory fillet can be rapidly formed.

If the Bi content is less than 0.0040 mass %, then there is a risk that the functions and effects described above will become insufficient, thereby leading to degradation in brazeability. In addition, if the Bi content is greater than 0.070 mass %, then the filler material surface will tend to oxidize. As a result, there is a risk that a sturdy oxide film will be formed on the surface of the filler material during heating when brazing is being performed and, depending on the circumstances, there is a risk that brazeability will degrade.

To further increase the functions and effects produced by the coexistence of Mg and Bi described above, it is preferable to adjust the balance between the amount of Bi and the amount of Mg in the molten filler to an appropriate range. Here, the amount of Mg in the molten filler is the sum of the amount of Mg included beforehand in the filler material and the amount of Mg that diffused from the core material into the filler material. For this reason, if the amount of Mg in the core material is small, then it is preferable to likewise make the amount of Bi in the filler material accordingly small. For example, if the amount of Mg in the core material is 0.20 mass % or more and less than 1.0 mass %, then, by setting the amount of Bi in the filler material to 0.0040 mass % or more and less than 0.030 mass %, the balance between the amount of Bi and the amount of Mg can be set to a suitable range.

In addition to the essentially included Si, Mg, and Bi, the filler material may further optionally contain other elements. Sb (antimony), Pb (lead), Ba (barium), Na (sodium), Sr (strontium), Fe (iron), Mn (manganese), Ti (titanium), Zn (zinc), Cu (copper), and the like are examples of elements that can be included in the filler material.

Sb: 0.0070 Mass % or More and 0.050 Mass % or Less, Pb: 0.0040 Mass % or More and 0.070 Mass % or Less, Ba: 0.0040 Mass % or More and 0.070 Mass % or Less The filler material may further contain one or two or more from among these elements. These elements function to further increase the fluidity of the filler.

With regard to the brazing sheet as described above, the Bi included in the filler material acts to increase the fluidity of the filler and, in turn, to promote the formation of the fillet. Depending on the location, the shape, or the like of the intended joint, there are situations in which the formation of the fillet can be promoted much more by further increasing the fluidity of the filler. In such a situation, by adding one or two or more from among the above-mentioned elements, the fluidity of the filler can be further increased.

However, if the content of these elements becomes excessively large, then there is a risk that the fluidity of the filler will become excessively high and formation of the fillet will become difficult. For this reason, by setting the content of the Sb, Pb, and Ba in the respective above-mentioned specified ranges, the fluidity of the filler can be adjusted to a suitable range, and thereby formation of the fillet can be further promoted.

Na: 0.0020 Mass % or More and 0.020 Mass % or Less, Sr: 0.0020 Mass % or More and 0.050 Mass % or Less The filler material may further contain one or two from among these elements. Both of these elements function to reduce the particle size of Si particles in the filler material and to impede: local melting of the core material during heating when brazing is being performed, the formation of through holes, and the like. However, if the content of these elements becomes excessively large, there is a risk that, instead, formation of the fillet will become difficult. By setting the content of these elements in the above-mentioned specified ranges, the adverse effects on fillet formation can be avoided while at the same time local melting of the core material during heating when brazing is being performed, the formation of through holes, and the like can be impeded.

Fe: 0.050 Mass % or More and 0.80 Mass % or Less, Mn: 0.050 Mass % or More and 0.20 Mass % or Less, Ti: 0.010 Mass % or More and 0.15 Mass % or Less The filler material may further contain one or two or more from among these elements. These elements function to reduce the fluidity of the filler.

With regard to the brazing sheet described above, the Bi included in the filler material acts to increase the fluidity of the filler and, in turn, to promote the formation of the fillet. However, depending on the location, the shape, or the like of the intended joint, the formation of the fillet can be promoted much more by reducing the fluidity of the filler. In such a situation, by adding one or two or more from among the above-mentioned elements, the increase in the fluidity of the filler can be curtailed.

However, if the content of these elements becomes excessively large, then there is a risk that the fluidity of the filler will become excessively low and the formation of the fillet will become difficult. For this reason, by setting the content of the Fe, Mn, and Ti in the above-mentioned respective specified ranges, the fluidity of the filler can be adjusted to a suitable range, and therefore the formation of the fillet can be further promoted.

Zn: 0.050 Mass % or More and 3.0 Mass % or Less

The filler material may further contain Zn. By setting the Zn content in the filler material in the above-mentioned specified range, the electric potential of the filler material can be appropriately reduced. Thereby, the filler material can be caused to function as a sacrificial anode material, and corrosion of the aluminum product can be inhibited for a longer time.

If the Zn content is greater than the above-mentioned specified range, then there is a risk that the electric potential of the filler material will become excessively low, and maintaining the sacrificial corrosion-protection effect over the long term will become difficult.

Cu: 0.020 Mass % or More and 1.0 Mass % or Less

The filler material may further contain Cu. By setting the Cu content in the filler material in the above-mentioned specified range, the electric potential of the filler material can be increased appropriately. Thereby, the filler material can be caused to function as a sacrificial anode material and corrosion resistance of the aluminum product can be further improved. Furthermore, in this case, the melting point of the filler material can be reduced, and brazeability can also be further improved.

If the Cu content is greater than the above-mentioned specified range, then there is a risk that the electric potential of the filler material will excessively rise, and it will become difficult to maintain the sacrificial corrosion-protection effect over the long term.

The filler material may contain elements other than the elements described above. However, if the content of elements, such as Li (lithium), Be (beryllium), Ca (calcium) and the like, which have low free energy of oxide formation, becomes large, then the filler material surface will tend to oxidize during heating when brazing is being performed, which will lead to degradation in brazeability. Accordingly, from the viewpoint of avoiding degradation in brazeability, it is preferable to make the content of these elements small. For example, by restricting the amount of Li in the filler material to less than 0.0040 mass %, the amount of Be in the filler material to less than 0.0040 mass %, and the amount of Ca in the filler material to less than 0.0030 mass %, degradation in brazeability caused by these elements can be avoided.

Sacrificial Anode Material

In addition to the above-mentioned core material and the above-mentioned filler material, the brazing sheet may further comprise a sacrificial anode material. That is, the brazing sheet may comprise the core material, the filler material, which is layered on one sheet surface of the core material, and the sacrificial anode material, which is layered on the other sheet surface of the core material. The sacrificial anode material may have a chemical composition containing one or two or more from among Zn: 0.90 mass % or more and 6.0 mass % or less, In: 0.010 mass % or more and 0.10 mass % or less, and Sn: 0.010 mass % or more and 0.10 mass % or less, the remainder being Al and unavoidable impurities.

By layering the sacrificial anode material, which has the above-mentioned specified chemical composition, on the core material, corrosion of the aluminum product can be inhibited for a longer time. If the content of any one of Zn, In, and Sn is greater than the above-mentioned respective specified ranges, then there is a risk that the electric potential of the sacrificial anode material will excessively decrease. As a result, maintaining the sacrificial corrosion-protection effect over the long term will become difficult.

The brazing sheet can be prepared, for example, by preparing an original sheet of each layer constituting the layered structure of the brazing sheet and then cladding them. In addition, after the clad sheet has been prepared by cladding, the clad sheet may be etched with an acid or an alkali and then used as a brazing sheet. Owing to the etching, the thick sturdy oxide film formed on the surface of the filler material in the process of manufacturing the brazing sheet can be removed and substituted with a natural oxidation film. This natural oxidation film is easily weakened by Mg. Consequently, brazeability can be further improved.

If the etching of the brazing sheet is performed before the brazing, it may be performed at any stage. For example, etching may be performed immediately after the manufacture of the brazing sheet, or etching may be performed after the brazing sheet has been formed into a desired shape.

In addition, after etching has been performed, a protective oil may be applied to the brazing sheet surface. A protective oil having a decomposition temperature that is 200-380° C. in an inert gas atmosphere can be used as the protective oil. In addition, the application amount of the protective oil can be set to 500 mg/cm$^2$ or more. In this case, after etching, for example, oxidation of the surface of the brazing sheet due to condensation or the like can be better inhibited over the long term.

If the decomposition temperature of the protective oil is lower than 200° C., then there is a risk that the protective oil will vaporize while the brazing sheet is being stored, and thereby the surface of the brazing sheet will tend to oxidize. In addition, if the decomposition temperature of the protective oil is higher than 380° C., then there is a risk that protective oil will remain on the filler material surface during heating when brazing is being performed, which will lead to degradation in brazeability. If the application amount of the protective oil is less than 500 mg/cm$^2$, then there is a risk that the effect of inhibiting the oxidation of the brazing sheet surface will become insufficient.

The brazing sheet can be used both in brazing in an inert gas atmosphere in which flux is not used and in brazing in a vacuum in which flux is not used. In the case of brazing in an inert gas atmosphere in which the brazing sheet is used, in the initial stage of brazing, as described above, the oxide film present on the filler material surface is weakened by Mg in the filler material. Then, after the filler has melted, owing to the reaction between Mg in the filler and the oxide film contacting the filler, the oxide film present on the filler surface and on the opposing-material surface is sufficiently broken down at the intended joint between the brazing sheet and the opposing material. Thereby, a joint comprising a satisfactory fillet can be rapidly formed.

If brazing is performed in a vacuum, then, the same as in brazing in an inert gas atmosphere as described above, the oxide film on the filler material surface is weakened by Mg in the filler material in the initial stage of brazing. In addition, after the filler has melted, the oxide film on the intended joint is sufficiently broken down by the reaction with Mg in the filler. Furthermore, in addition to these mechanisms, Mg may evaporate from the filler material in the temperature range above 570° C., which fully melts the filler material, and the oxide film present on the filler surface may be mechanically broken down.

Thus, in brazing in a vacuum, after melting of the filler, the oxide film is broken down by both mechanisms, i.e., the reaction with Mg and the evaporation of Mg. Consequently, the oxide film can be broken down more rapidly than by brazing in an inert gas atmosphere. Accordingly, if the brazing sheet is used in brazing in a vacuum, then brazeability can be further improved beyond that of brazing in an inert gas atmosphere.

WORKING EXAMPLES

Working examples of the brazing sheet and the manufacturing method thereof are explained below. It is noted that the brazing sheet and the manufacturing method thereof according to the present invention are not limited to the modes below, and the constitutions can be modified as appropriate within a range that does not depart from the gist thereof.

The brazing sheets (Test Materials A1-A38, B1-B33) used in the present example have the layered structures and chemical compositions shown in Table 1 to Table 6. The preparation of the test materials was performed by the following method. First, an original sheet of each layer that constitutes the layered structures shown in Table 1 to Table 6 was prepared. Then, by performing appropriate combinations of hot rolling and cold rolling on these original sheets, Test Materials A1-A38, B1-B33 were prepared.

Each of the Test Materials A1-A27, B1-B27 has a two-layer structure in which the filler material is layered on one side of the core material. In addition, each of the Test Materials A28, A29, B28, B29 has a three-layer structure in which the filler material is layered on one surface of the core material, and a sacrificial anode material is layered on the other surface. The thickness of each of these test materials was set to 0.4 mm. In addition, for each of these test materials, cold rolling was performed in the final stage of the manufacturing process, after which the test material was tempered to an O material by performing a final annealing.

It is noted that, in Test Material B4, in which the amount of Si in the filler material was greater than the above-mentioned specified range, and in Test Material B19, in which the amount of Mn in the core material was greater than the above-mentioned specified range, cracks occurred in the original sheets during the manufacturing process. Consequently, the following evaluation was not performed for Test Materials B4 and B19.

Each of the Test Materials A30-A38, B30-B33 has a three-layer structure in which the filler material is layered on both surfaces of the core material. The thickness of each of these test materials was set to 0.1 mm. In addition, each of these test materials, after a final annealing was performed in the final stage of the manufacturing process, was tempered to an H14 material by performing cold rolling.

Test Example 1

The present example is an example in which the average particle size of Si particles in the filler material and the fluidity and the erosion characteristics of the filler were evaluated for test materials (Test Materials A1-A29, B1-B25) having a thickness of 0.4 mm as shown in Table 1, Table 2, Table 4, and Table 5.

Average Particle Size of Si Particles

For some of the test materials (refer to Table 7 and Table 8), a cross section (L-ST plane) in a direction parallel to the rolling direction was observed using a scanning electron microscope (SEM). Based on SEM images obtained thereby, the average particle size of Si particles present in the filler material was calculated. Specifically, the circle-equivalent diameters of Si particles present in a visual field of 40 μm×100 μm was calculated, and the average value of these circle-equivalent diameters was taken as the average particle size of the Si particles. The average particle size of the Si particles for each test material was as recorded in the "Si particle size (μm)" column in Table 7 and Table 8.

Fluidity and Erosion Characteristics of the Filler

A test specimen having a width of 50 mm and a length of 150 mm was sampled from each test material and was suspended inside a heating furnace such that its length direction was parallel to the vertical direction. Furthermore, the test specimen was heated under heating conditions in which, while nitrogen gas flowed into the heating furnace, the time after the temperature of the test specimen reached 450° C. until it reached 600° C. was approximately 16 min, and thereby the filler material was caused to melt. The oxygen concentration inside the furnace during heating was 45-51 ppm.

Immediately after the temperature of the test specimen reached 600° C., the heating was stopped, and the test specimen was cooled inside the furnace. With regard to the resulting test specimens 1, filler material 12 pooled at an end part 11 on the side that was disposed downward, as shown in FIG. 1. A portion 13, at which the filler material 12 pooled, and a portion 14, at which the filler material 12 did not pool, were separated by cutting at a location 110 that was spaced apart from the end 11 by $\frac{1}{4}^{th}$ of the overall length. Then, a fluidity coefficient K1 was calculated according to the equation below, using: weight $W_0$ (g) prior to brazing of the portion 13 at which the filler material 12 pooled; weight $W_B$ (g) after brazing; and cladding percentage α (%).

$$K1 = (4W_B - W_0)/(3\alpha W_0)$$

The fluidity coefficient of each test material is as shown in the "fluidity coefficient" column in Table 7 and Table 8. It shows that the larger the value of the fluidity coefficient, the greater the fluidity of the filler. In addition, based on these fluidity coefficients, the fluidity of the fillers was evaluated as follows. That is, if the fluidity coefficient was 0.45 or more, then symbol "A" was recorded in the "evaluation" column of the same table; if the fluidity coefficient was 0.35 or more and less than 0.45, then symbol "B" was recorded; if the fluidity coefficient was 0.25 or more and less than 0.35, then symbol "C" was recorded; and if the fluidity coefficient was less than 0.25, then symbol "D" was recorded. In the evaluation of fluidity of the fillers, because the cases of symbols A-C, in which the fluidity coefficient was 0.25 or more, had sufficient fluidity for the filler to form a fillet, those cases were judged to be acceptable. In addition, because the cases of symbol D, in which the fluidity coefficient was less than 0.25, did not have sufficient fluidity for the filler to form a fillet, those cases were judged to be unacceptable.

In addition, with regard to the portion 14 (refer to FIG. 1) from among the portions separated from the test specimen 1 at which the filler material 12 did not pool, a cross section (L-ST plane) parallel to the rolling direction was observed using an optical microscope, and the erosion depth of the core material 15 was measured. Then, based on the erosion depth of the core material 15, the erosion characteristics of the fillers were evaluated as below. That is, if the maximum value of the erosion depth of the core material 15 was less than 15% of the thickness of the core material 15 before brazing, then the symbol "A" was recorded in the "filler erosion characteristics" column in Table 7 and Table 8; if the erosion depth was 15% or more and less than 20%, then symbol "B" was recorded; if the erosion depth was 20% or more and less than 30%, then symbol "C" was recorded; and if the erosion depth was 30% or more, then symbol "D" was recorded. In the evaluation of the erosion characteristics of the fillers, the cases of symbols A-C, in which the maximum value of the erosion depth of the core material 15 was less than 30% of the thickness of the core material 15 before brazing, were judged to be acceptable because erosion of the core material 15 was sufficiently inhibited. In addition, the cases of symbol D, in which the maximum value of the erosion depth of the core material 15 was 30% or more of the thickness of the core material 15 before brazing, were judged to be unacceptable because the core material excessively corroded.

TABLE 1

| Test Material Symbol | Layered Structure | Thickness (mm) Each Layer | Thickness (mm) Total | Si | Fe | Cu | Mn | Mg | Zn | Ti | Zr | Cr | Bi | Li | Be | Sb | Pb | Ba | Na | Sr | In | Sn |
|---|---|---|---|---|---|---|---|---|---|---|---|---|---|---|---|---|---|---|---|---|---|---|
| A1 | Filler material | 0.04 | 0.4 | 10.3 | — | — | — | 0.075 | — | — | — | — | 0.022 | <0.004 | <0.004 | — | — | — | — | — | — | — |
|  | Core material | 0.36 |  | — | — | — | — | 0.620 | — | — | — | — | — | — | — | — | — | — | — | — | — | — |
| A2 | Filler material | 0.04 | 0.4 | 6.0 | — | — | — | 0.077 | — | — | — | — | 0.021 | <0.004 | <0.004 | — | — | — | — | — | — | — |
|  | Core material | 0.36 |  | — | — | — | — | 0.590 | — | — | — | — | — | — | — | — | — | — | — | — | — | — |
| A3 | Filler material | 0.04 | 0.4 | 13.0 | — | — | — | 0.076 | — | — | — | — | 0.019 | <0.004 | <0.004 | — | — | — | — | — | — | — |
|  | Core material | 0.36 |  | — | — | — | — | 0.600 | — | — | — | — | — | — | — | — | — | — | — | — | — | — |
| A4 | Filler material | 0.04 | 0.4 | 10.2 | — | — | — | 0.051 | — | — | — | — | 0.004 | <0.004 | <0.004 | — | — | — | — | — | — | — |
|  | Core material | 0.36 |  | — | — | — | — | 0.610 | — | — | — | — | — | — | — | — | — | — | — | — | — | — |
| A5 | Filler material | 0.04 | 0.4 | 9.9 | — | — | — | 0.099 | — | — | — | — | 0.069 | <0.004 | <0.004 | — | — | — | — | — | — | — |
|  | Core material | 0.36 |  | — | — | — | — | 0.620 | — | — | — | — | — | — | — | — | — | — | — | — | — | — |
| A6 | Filler material | 0.04 | 0.4 | 10.1 | — | — | — | 0.072 | — | — | — | — | 0.019 | <0.004 | <0.004 | — | — | — | — | — | — | — |
|  | Core material | 0.36 |  | — | — | — | — | 0.200 | — | — | — | — | — | — | — | — | — | — | — | — | — | — |
| A7 | Filler material | 0.04 | 0.4 | 10.3 | — | — | — | 0.075 | — | — | — | — | 0.018 | <0.004 | <0.004 | — | — | — | — | — | — | — |
|  | Core material | 0.36 |  | — | — | — | — | 1.300 | — | — | — | — | — | — | — | — | — | — | — | — | — | — |
| A8 | Filler material | 0.04 | 0.4 | 10.0 | — | — | — | 0.074 | — | — | — | — | 0.021 | <0.004 | <0.004 | 0.007 | — | — | — | — | — | — |
|  | Core material | 0.36 |  | — | — | — | — | 0.570 | — | — | — | — | — | — | — | — | — | — | — | — | — | — |
| A9 | Filler material | 0.04 | 0.4 | 10.1 | — | — | — | 0.073 | — | — | — | — | 0.020 | <0.004 | <0.004 | 0.050 | — | — | — | — | — | — |
|  | Core material | 0.36 |  | — | — | — | — | 0.630 | — | — | — | — | — | — | — | — | — | — | — | — | — | — |
| A10 | Filler material | 0.04 | 0.4 | 9.9 | — | — | — | 0.077 | — | — | — | — | 0.023 | <0.004 | <0.004 | — | 0.004 | — | — | — | — | — |
|  | Core material | 0.36 |  | — | — | — | — | 0.600 | — | — | — | — | — | — | — | — | — | — | — | — | — | — |
| A11 | Filler material | 0.04 | 0.4 | 9.7 | — | — | — | 0.079 | — | — | — | — | 0.019 | <0.004 | <0.004 | — | 0.069 | — | — | — | — | — |
|  | Core material | 0.36 |  | — | — | — | — | 0.600 | — | — | — | — | — | — | — | — | — | — | — | — | — | — |
| A12 | Filler material | 0.04 | 0.4 | 10.4 | — | — | — | 0.074 | — | — | — | — | 0.018 | <0.004 | <0.004 | — | — | 0.004 | — | — | — | — |
|  | Core material | 0.36 |  | — | — | — | — | 0.580 | — | — | — | — | — | — | — | — | — | — | — | — | — | — |
| A13 | Filler material | 0.04 | 0.4 | 10.0 | — | — | — | 0.076 | — | — | — | — | 0.020 | <0.004 | <0.004 | — | — | 0.068 | — | — | — | — |
|  | Core material | 0.36 |  | — | — | — | — | 0.610 | — | — | — | — | — | — | — | — | — | — | — | — | — | — |
| A14 | Filler material | 0.04 | 0.4 | 9.8 | — | — | — | 0.075 | — | — | — | — | 0.020 | <0.004 | <0.004 | 0.015 | — | — | 0.002 | — | — | — |
|  | Core material | 0.36 |  | — | — | — | — | 0.600 | — | — | — | — | — | — | — | — | — | — | — | — | — | — |
| A15 | Filler material | 0.04 | 0.4 | 10.3 | — | — | — | 0.072 | — | — | — | — | 0.018 | <0.004 | <0.004 | — | 0.032 | — | 0.020 | — | — | — |
|  | Core material | 0.36 |  | — | — | — | — | 0.620 | — | — | — | — | — | — | — | — | — | — | — | — | — | — |

TABLE 1-continued

| Test Material Symbol | Layered Structure | Thickness (mm) Each Layer | Thickness (mm) Total | Chemical Composition (mass %) Si | Fe | Cu | Mn | Mg | Zn | Ti | Zr | Cr | Bi | Li | Be | Sb | Pb | Ba | Na | Sr | In | Sn |
|---|---|---|---|---|---|---|---|---|---|---|---|---|---|---|---|---|---|---|---|---|---|---|
| A16 | Filler material | 0.04 | 0.4 | 10.2 | — | — | — | 0.077 | — | — | — | — | 0.018 | <0.004 | <0.004 | 0.011 | — | 0.024 | — | 0.002 | — | — |
| | Core material | 0.36 | | — | — | — | — | 0.620 | — | — | — | — | — | — | — | — | — | — | — | — | — | — |
| A17 | Filler material | 0.04 | 0.4 | 10.3 | — | — | — | 0.075 | — | — | — | — | 0.022 | <0.004 | <0.004 | — | 0.025 | 0.019 | — | 0.049 | — | — |
| | Core material | 0.36 | | — | — | — | — | 0.570 | — | — | — | — | — | — | — | — | — | — | — | — | — | — |

TABLE 2

| Test Material Symbol | Layered Structure | Thickness (mm) Each Layer | Thickness (mm) Total | Chemical Composition (mass %) Si | Fe | Cu | Mn | Mg | Zn | Ti | Zr | Cr |
|---|---|---|---|---|---|---|---|---|---|---|---|---|
| A18 | Filler material | 0.04 | 0.4 | 9.9 | 0.80 | — | — | 0.074 | — | — | — | — |
| | Core material | 0.36 | | — | — | — | — | 0.630 | — | — | — | — |
| A19 | Filler material | 0.04 | 0.4 | 9.6 | — | — | 0.20 | 0.075 | — | — | — | — |
| | Core material | 0.36 | | — | — | — | — | 0.610 | — | — | — | — |
| A20 | Filler material | 0.04 | 0.4 | 10.4 | — | — | — | 0.076 | — | 0.15 | — | — |
| | Core material | 0.36 | | — | — | — | — | 0.600 | — | — | — | — |
| A21 | Filler material | 0.04 | 0.4 | 10.0 | 0.27 | — | 0.08 | 0.076 | — | 0.07 | — | — |
| | Core material | 0.36 | | — | — | — | — | 0.590 | — | — | — | — |
| A22 | Filler material | 0.04 | 0.4 | 10.1 | — | — | — | 0.075 | — | — | — | — |
| | Core material | 0.36 | | 0.93 | 0.82 | — | 1.21 | 0.620 | — | 0.08 | 0.27 | — |
| A23 | Filler material | 0.04 | 0.4 | 9.8 | — | — | — | 0.074 | — | — | — | — |
| | Core material | 0.36 | | — | 0.94 | 0.96 | — | 0.630 | — | — | — | 0.26 |
| A24 | Filler material | 0.04 | 0.4 | 9.9 | — | — | — | 0.073 | — | — | — | — |
| | Core material | 0.36 | | 0.22 | — | 1.89 | 0.440 | — | — | — | — | |
| A25 | Filler material | 0.04 | 0.4 | 10.1 | — | — | — | 0.078 | 0.06 | — | — | — |
| | Core material | 0.36 | | — | — | — | — | 0.590 | — | — | — | — |
| A26 | Filler material | 0.04 | 0.4 | 9.7 | — | — | — | 0.076 | 2.91 | — | — | — |
| | Core material | 0.36 | | — | — | — | — | 0.580 | — | — | — | — |
| A27 | Filler material | 0.04 | 0.4 | 10.3 | — | 0.97 | — | 0.072 | 2.89 | — | — | — |
| | Core material | 0.36 | | — | — | — | — | 0.610 | — | — | — | — |
| A28 | Filler material | 0.04 | 0.4 | 10.0 | — | — | — | 0.074 | — | — | — | — |
| | Core material | 0.28 | | — | 0.20 | — | — | 0.610 | — | — | — | — |
| | Sacrificial anode material | 0.08 | | — | — | — | — | — | 0.92 | — | — | — |
| A29 | Filler material | 0.04 | 0.4 | 9.9 | — | — | — | 0.075 | — | — | — | — |
| | Core material | 0.28 | | — | 0.20 | — | — | 0.620 | — | — | — | — |

TABLE 2-continued

| | | | | | | | | | | | |
|---|---|---|---|---|---|---|---|---|---|---|---|
| Sacrificial anode material | 0.08 | — | — | — | — | — | 5.90 | — | — | — | |

| Test Material Symbol | Layered Structure | Chemical Composition (mass %) | | | | | | | | | |
|---|---|---|---|---|---|---|---|---|---|---|---|
| | | Bi | Li | Be | Sb | Pb | Ba | Na | Sr | In | Sn |
| A18 | Filler material | 0.021 | <0.004 | <0.004 | — | — | — | — | — | — | — |
| | Core material | — | — | — | — | — | — | — | — | — | — |
| A19 | Filler material | 0.022 | <0.004 | <0.004 | — | — | — | — | — | — | — |
| | Core material | — | — | — | — | — | — | — | — | — | — |
| A20 | Filler material | 0.021 | <0.004 | <0.004 | — | — | — | — | — | — | — |
| | Core material | — | — | — | — | — | — | — | — | — | — |
| A21 | Filler material | 0.020 | <0.004 | <0.004 | 0.017 | — | 0.033 | 0.013 | — | — | — |
| | Core material | — | — | — | — | — | — | — | — | — | — |
| A22 | Filler material | 0.021 | <0.004 | <0.004 | — | — | — | — | — | — | — |
| | Core material | — | — | — | — | — | — | — | — | — | — |
| A23 | Filler material | 0.020 | <0.004 | <0.004 | — | — | — | — | — | — | — |
| | Core material | — | — | — | — | — | — | — | — | — | — |
| A24 | Filler material | 0.021 | <0.004 | <0.004 | — | — | — | — | — | — | — |
| | Core material | — | — | — | — | — | — | — | — | — | — |
| A25 | Filler material | 0.020 | <0.004 | <0.004 | — | — | — | — | — | — | — |
| | Core material | — | — | — | — | — | — | — | — | — | — |
| A26 | Filler material | 0.018 | <0.004 | <0.004 | — | — | — | — | — | — | — |
| | Core material | — | — | — | — | — | — | — | — | — | — |
| A27 | Filler material | 0.019 | <0.004 | <0.004 | — | — | — | — | — | — | — |
| | Core material | — | — | — | — | — | — | — | — | — | — |
| A28 | Filler material | 0.022 | <0.004 | <0.004 | — | — | — | — | — | — | — |
| | Core material | — | — | — | — | — | — | — | — | — | — |
| | Sacrificial anode material | — | — | — | — | — | — | — | — | — | — |
| A29 | Filler material | 0.021 | <0.004 | <0.004 | — | — | — | — | — | — | — |
| | Core material | — | — | — | — | — | — | — | — | — | — |
| | Sacrificial anode material | — | — | — | — | — | — | — | — | — | — |

TABLE 3

| Test Material Symbol | Layered Structure | Thickness (mm) Each Layer | Thickness (mm) Total | Chemical Composition (mass %) Si | Fe | Cu | Mn | Mg | Zn | Ti | Zr | Cr | Bi | Li | Be | Sb | Pb | Ba | Na | Sr | In | Sn |
|---|---|---|---|---|---|---|---|---|---|---|---|---|---|---|---|---|---|---|---|---|---|---|
| A30 | Filler material | 0.01 | 0.1 | 10.0 | — | — | — | 0.076 | — | — | — | — | 0.022 | <0.004 | <0.004 | — | — | — | — | — | — | — |
|  | Core material | 0.08 |  | 0.35 | — | — | 1.20 | 0.580 | — | — | — | — | — | — | — | — | — | — | — | — | — | — |
|  | Filler material | 0.01 |  | 10.0 | — | — | — | — | — | — | — | — | 0.022 | <0.004 | <0.004 | — | — | — | — | — | — | — |
| A31 | Filler material | 0.01 | 0.1 | 9.8 | — | — | — | 0.076 | — | — | — | — | 0.018 | <0.004 | <0.004 | — | — | — | — | — | — | — |
|  | Core material | 0.08 |  | 0.33 | — | — | 1.22 | 0.200 | — | — | — | — | — | — | — | — | — | — | — | — | — | — |
|  | Filler material | 0.01 |  | 9.8 | — | — | — | 0.076 | — | — | — | — | 0.018 | <0.004 | <0.004 | — | — | — | — | — | — | — |
| A32 | Filler material | 0.01 | 0.1 | 9.8 | — | — | — | 0.074 | — | — | — | — | 0.019 | <0.004 | <0.004 | — | — | — | — | — | — | — |
|  | Core material | 0.08 |  | 0.35 | — | — | 1.21 | 0.570 | 0.12 | — | — | — | — | — | — | — | — | — | — | — | — | — |
|  | Filler material | 0.01 |  | 9.8 | — | — | — | 0.074 | — | — | — | — | 0.019 | <0.004 | <0.004 | — | — | — | — | — | — | — |
| A33 | Filler material | 0.01 | 0.1 | 10.1 | — | — | — | 0.075 | — | — | — | — | 0.021 | <0.004 | <0.004 | — | — | — | — | — | — | — |
|  | Core material | 0.08 |  | 0.35 | — | — | 1.16 | 0.620 | 2.93 | — | — | — | — | — | — | — | — | — | — | — | — | — |
|  | Filler material | 0.01 |  | 10.1 | — | — | — | 0.075 | — | — | — | — | 0.021 | <0.004 | <0.004 | — | — | — | — | — | — | — |
| A34 | Filler material | 0.01 | 0.1 | 9.7 | — | — | — | 0.077 | — | — | — | — | 0.022 | <0.004 | <0.004 | — | — | — | — | — | — | — |
|  | Core material | 0.08 |  | 0.35 | — | — | 1.18 | 0.600 | — | — | — | — | — | — | — | — | — | — | — | — | 0.011 | — |
|  | Filler material | 0.01 |  | 9.7 | — | — | — | 0.077 | — | — | — | — | 0.022 | <0.004 | <0.004 | — | — | — | — | — | — | — |
| A35 | Filler material | 0.01 | 0.1 | 9.9 | — | — | — | 0.077 | — | — | — | — | 0.020 | <0.004 | <0.004 | — | — | — | — | — | — | — |
|  | Core material | 0.08 |  | 0.35 | — | — | 1.17 | 0.620 | — | — | — | — | — | — | — | — | — | — | — | — | 0.098 | — |
|  | Filler material | 0.01 |  | 9.9 | — | — | — | 0.077 | — | — | — | — | 0.020 | <0.004 | <0.004 | — | — | — | — | — | — | — |
| A36 | Filler material | 0.01 | 0.1 | 10.3 | — | — | — | 0.074 | — | — | — | — | 0.022 | <0.004 | <0.004 | — | — | — | — | — | — | — |
|  | Core material | 0.08 |  | 0.35 | — | — | 1.19 | 0.590 | — | — | — | — | — | — | — | — | — | — | — | — | — | 0.012 |
|  | Filler material | 0.01 |  | 10.3 | — | — | — | 0.074 | — | — | — | — | 0.022 | <0.004 | <0.004 | — | — | — | — | — | — | — |
| A37 | Filler material | 0.01 | 0.1 | 10.1 | — | — | — | 0.073 | — | — | — | — | 0.018 | <0.004 | <0.004 | — | — | — | — | — | — | — |
|  | Core material | 0.08 |  | 0.35 | — | — | 1.22 | 0.580 | — | — | — | — | — | — | — | — | — | — | — | — | — | 0.100 |
|  | Filler material | 0.01 |  | 10.1 | — | — | — | 0.073 | — | — | — | — | 0.018 | <0.004 | <0.004 | — | — | — | — | — | — | — |
| A38 | Filler material | 0.01 | 0.1 | 9.9 | — | — | — | 0.075 | — | — | — | — | 0.021 | <0.004 | <0.004 | — | — | — | — | — | — | — |
|  | Core material | 0.08 |  | 0.35 | — | — | 1.21 | 0.610 | 0.40 | — | — | — | — | — | — | — | — | — | — | — | 0.033 | 0.047 |
|  | Filler material | 0.01 |  | 9.9 | — | — | — | 0.075 | — | — | — | — | 0.021 | <0.004 | <0.004 | — | — | — | — | — | — | — |

TABLE 4

| Test Material Symbol | Layered Structure | Thickness (mm) Each Layer | Thickness (mm) Total | Chemical Composition (mass %) Si | Fe | Cu | Mn | Mg | Zn | Ti | Zr | Cr | Bi | Li | Be | Sb | Pb | Ba | Na | Sr | In | Sn |
|---|---|---|---|---|---|---|---|---|---|---|---|---|---|---|---|---|---|---|---|---|---|---|
| B1 | Filler material | 0.04 | 0.4 | 4.7 | — | — | — | 0.074 | — | — | — | — | 0.021 | <0.004 | <0.004 | — | — | — | — | — | — | — |
|  | Core material | 0.36 |  |  | — | — | — | 0.630 | — | — | — | — | — | — | — | — | — | — | — | — | — | — |

TABLE 4-continued

| Test Material Symbol | Layered Structure | Thickness (mm) Each Layer | Total | Chemical Composition (mass %) | | | | | | | | | | | | | | | | | | |
|---|---|---|---|---|---|---|---|---|---|---|---|---|---|---|---|---|---|---|---|---|---|---|
| | | | | Si | Fe | Cu | Mn | Mg | Zn | Ti | Zr | Cr | Bi | Li | Be | Sb | Pb | Ba | Na | Sr | In | Sn |
| B2 | Filler material | 0.04 | 0.4 | 9.8 | — | — | — | 0.076 | — | — | — | — | 0.022 | 0.006 | <0.004 | — | — | — | — | — | — | — |
| | Core material | 0.36 | | — | — | — | — | 0.630 | — | — | — | — | — | — | — | — | — | — | — | — | — | — |
| B3 | Filler material | 0.04 | 0.4 | 9.9 | — | — | — | 0.074 | — | — | — | — | 0.022 | <0.004 | 0.005 | — | — | — | — | — | — | — |
| | Core material | 0.36 | | — | — | — | — | 0.590 | — | — | — | — | — | — | — | — | — | — | — | — | — | — |
| B4 | Filler material | 0.04 | 0.4 | 15.2 | — | — | — | 0.073 | — | — | — | — | 0.018 | <0.004 | <0.004 | — | — | — | — | — | — | — |
| | Core material | 0.36 | | — | — | — | — | 0.610 | — | — | — | — | — | — | — | — | — | — | — | — | — | — |
| B5 | Filler material | 0.04 | 0.4 | 10.1 | — | — | — | 0.033 | — | — | — | — | 0.019 | <0.004 | <0.004 | — | — | — | — | — | — | — |
| | Core material | 0.36 | | — | — | — | — | 0.590 | — | — | — | — | — | — | — | — | — | — | — | — | — | — |
| B6 | Filler material | 0.04 | 0.4 | 9.9 | — | — | — | 0.130 | — | — | — | — | 0.020 | <0.004 | <0.004 | — | — | — | — | — | — | — |
| | Core material | 0.36 | | — | — | — | — | 0.600 | — | — | — | — | — | — | — | — | — | — | — | — | — | — |
| B7 | Filler material | 0.04 | 0.4 | 9.9 | — | — | — | 0.074 | — | — | — | — | 0.002 | <0.004 | <0.004 | — | — | — | — | — | — | — |
| | Core material | 0.36 | | — | — | — | — | 0.620 | — | — | — | — | — | — | — | — | — | — | — | — | — | — |
| B8 | Filler material | 0.04 | 0.4 | 10.2 | — | — | — | 0.076 | — | — | — | — | 0.090 | <0.004 | <0.004 | — | — | — | — | — | — | — |
| | Core material | 0.36 | | — | — | — | — | 0.630 | — | — | — | — | — | — | — | — | — | — | — | — | — | — |
| B9 | Filler material | 0.04 | 0.4 | 10.2 | — | — | — | 0.073 | — | — | — | — | 0.021 | <0.004 | <0.004 | — | — | — | — | — | — | — |
| | Core material | 0.36 | | — | — | — | — | 0.150 | — | — | — | — | — | — | — | — | — | — | — | — | — | — |
| B10 | Filler material | 0.04 | 0.4 | 9.7 | — | — | — | 0.075 | — | — | — | — | 0.022 | <0.004 | <0.004 | — | — | — | — | — | — | — |
| | Core material | 0.36 | | — | — | — | — | 1.520 | — | — | — | — | — | — | — | — | — | — | — | — | — | — |
| B11 | Filler material | 0.04 | 0.4 | 10.2 | — | — | — | 0.074 | — | — | — | — | 0.018 | <0.004 | <0.004 | 0.075 | — | — | — | — | — | — |
| | Core material | 0.36 | | — | — | — | — | 0.610 | — | — | — | — | — | — | — | — | — | — | — | — | — | — |
| B12 | Filler material | 0.04 | 0.4 | 9.8 | — | — | — | 0.073 | — | — | — | — | 0.020 | <0.004 | <0.004 | — | 0.081 | — | — | — | — | — |
| | Core material | 0.36 | | — | — | — | — | 0.620 | — | — | — | — | — | — | — | — | — | — | — | — | — | — |
| B13 | Filler material | 0.04 | 0.4 | 10.1 | — | — | — | 0.074 | — | — | — | — | 0.021 | <0.004 | <0.004 | — | — | 0.077 | — | — | — | — |
| | Core material | 0.36 | | — | — | — | — | 0.590 | — | — | — | — | — | — | — | — | — | — | — | — | — | — |
| B14 | Filler material | 0.04 | 0.4 | 9.9 | — | — | — | 0.073 | — | — | — | — | 0.017 | <0.004 | <0.004 | — | — | — | 0.029 | — | — | — |
| | Core material | 0.36 | | — | — | — | — | 0.590 | — | — | — | — | — | — | — | — | — | — | — | — | — | — |
| B15 | Filler material | 0.04 | 0.4 | 10.0 | — | — | — | 0.073 | — | — | — | — | 0.020 | <0.004 | <0.004 | — | — | — | — | 0.069 | — | — |
| | Core material | 0.36 | | — | — | — | — | 0.620 | — | — | — | — | — | — | — | — | — | — | — | — | — | — |

TABLE 5

| Test Material Symbol | Layer Structure | Thickness (mm) Each Layer | Total | Chemical Composition (mass %) | | | | | | |
|---|---|---|---|---|---|---|---|---|---|---|
| | | | | Si | Fe | Cu | Mn | Mg | Zn | Ti |
| B16 | Filler material | 0.04 | 0.4 | 9.9 | 1.12 | — | — | 0.075 | — | — |
| | Core material | 0.36 | | — | — | — | — | 0.600 | — | — |

TABLE 5-continued

| Symbol | Layer Structure | | | | | | | | | |
|---|---|---|---|---|---|---|---|---|---|---|
| B17 | Filler material | 0.04 | 0.4 | 10.2 | — | — | 0.29 | 0.074 | — | — |
| | Core material | 0.36 | | — | — | — | | 0.590 | — | — |
| B18 | Filler material | 0.04 | 0.4 | 10.1 | — | — | — | 0.073 | — | 0.22 |
| | Core material | 0.36 | | — | — | — | | 0.580 | — | — |
| B19 | Filler material | 0.04 | 0.4 | 9.8 | — | — | — | 0.076 | — | — |
| | Core material | 0.36 | | — | — | — | 2.41 | 0.590 | — | — |
| B20 | Filler material | 0.04 | 0.4 | 10.2 | — | — | — | 0.073 | — | — |
| | Core material | 0.36 | | 1.52 | — | — | | 0.580 | — | — |
| B21 | Filler material | 0.04 | 0.4 | 9.9 | — | — | — | 0.073 | — | — |
| | Core material | 0.36 | | — | 1.62 | — | | 0.610 | — | — |
| B22 | Filler material | 0.04 | 0.4 | 10.1 | — | — | — | 0.074 | — | — |
| | Core material | 0.36 | | — | — | 1.39 | | 0.620 | — | — |
| B23 | Filler material | 0.04 | 0.4 | 9.8 | — | — | — | 0.076 | — | — |
| | Core material | 0.36 | | — | — | — | | 0.600 | — | 0.18 |
| B24 | Filler material | 0.04 | 0.4 | 10.0 | — | — | — | 0.073 | — | — |
| | Core material | 0.36 | | — | — | — | | 0.610 | — | — |
| B25 | Filler material | 0.04 | 0.4 | 10.2 | — | — | — | 0.073 | — | — |
| | Core material | 0.36 | | — | — | — | | 0.610 | — | — |
| B26 | Filler material | 0.04 | 0.4 | 10.0 | — | — | — | 0.077 | 3.80 | — |
| | Core material | 0.36 | | — | — | — | | 0.580 | — | — |
| B27 | Filler material | 0.04 | 0.4 | 9.8 | — | 1.54 | — | 0.076 | 2.88 | — |
| | Core material | 0.36 | | — | — | — | | 0.610 | — | — |
| B28 | Filler material | 0.04 | 0.4 | 10.0 | — | — | — | 0.076 | — | — |
| | Core material | 0.28 | | — | — | — | | 0.590 | — | — |
| | Sacrificial anode material | 0.08 | | — | — | — | | — | 0.75 | — |
| B29 | Filler material | 0.04 | 0.4 | 9.9 | — | — | — | 0.075 | — | — |
| | Core material | 0.28 | | — | — | — | | 0.610 | — | — |
| | Sacrificial anode material | 0.08 | | — | — | — | | — | 7.20 | — |

| Test Material Symbol | Layer Structure | Chemical Composition (mass %) | | | | | | | | | | | |
|---|---|---|---|---|---|---|---|---|---|---|---|---|---|
| | | Zr | Cr | Bi | Li | Be | Sb | Pb | Ba | Na | Sr | In | Sn |
| B16 | Filler material | — | — | 0.021 | <0.004 | <0.004 | — | — | — | — | — | — | — |
| | Core material | — | — | — | — | — | — | — | — | — | — | — | — |
| B17 | Filler material | — | — | 0.018 | <0.004 | <0.004 | — | — | — | — | — | — | — |
| | Core material | — | — | — | — | — | — | — | — | — | — | — | — |
| B18 | Filler material | — | — | 0.022 | <0.004 | <0.004 | — | — | — | — | — | — | — |
| | Core material | — | — | — | — | — | — | — | — | — | — | — | — |
| B19 | Filler material | — | — | 0.022 | <0.004 | <0.004 | — | — | — | — | — | — | — |
| | Core material | — | — | — | — | — | — | — | — | — | — | — | — |

TABLE 5-continued

| | | | | | | | | | | | | | |
|---|---|---|---|---|---|---|---|---|---|---|---|---|---|
| B20 | Filler material | — | — | 0.019 | <0.004 | <0.004 | — | — | — | — | — | — | — |
| | Core material | — | — | — | — | — | — | — | — | — | — | — | — |
| B21 | Filler material | — | — | 0.018 | <0.004 | <0.004 | — | — | — | — | — | — | — |
| | Core material | — | — | — | — | — | — | — | — | — | — | — | — |
| B22 | Filler material | — | — | 0.020 | <0.004 | <0.004 | — | — | — | — | — | — | — |
| | Core material | — | — | — | — | — | — | — | — | — | — | — | — |
| B23 | Filler material | — | — | 0.021 | <0.004 | <0.004 | — | — | — | — | — | — | — |
| | Core material | — | — | — | — | — | — | — | — | — | — | — | — |
| B24 | Filler material | — | — | 0.020 | <0.004 | <0.004 | — | — | — | — | — | — | — |
| | Core material | 0.52 | — | — | — | — | — | — | — | — | — | — | — |
| B25 | Filler material | — | — | 0.021 | <0.004 | <0.004 | — | — | — | — | — | — | — |
| | Core material | — | 0.49 | — | — | — | — | — | — | — | — | — | — |
| B26 | Filler material | — | — | 0.018 | <0.004 | <0.004 | — | — | — | — | — | — | — |
| | Core material | — | — | — | — | — | — | — | — | — | — | — | — |
| B27 | Filler material | — | — | 0.021 | <0.004 | <0.004 | — | — | — | — | — | — | — |
| | Core material | — | — | — | — | — | — | — | — | — | — | — | — |
| B28 | Filler material | — | — | 0.019 | <0.004 | <0.004 | — | — | — | — | — | — | — |
| | Core material | — | — | — | — | — | — | — | — | — | — | — | — |
| | Sacrificial anode material | — | — | — | — | — | — | — | — | — | — | — | — |
| B29 | Filler material | — | — | 0.018 | <0.004 | <0.004 | — | — | — | — | — | — | — |
| | Core material | — | — | — | — | — | — | — | — | — | — | — | — |
| | Sacrificial anode material | — | — | — | — | — | — | — | — | — | — | — | — |

TABLE 6

| Test Material Symbol | Layered Structure | Thickness (mm) Each Layer | Total | Chemical Composition (mass %) | | | | | | | | | | | | | | | | | |
|---|---|---|---|---|---|---|---|---|---|---|---|---|---|---|---|---|---|---|---|---|---|
| | | | | Si | Fe | Cu | Mn | Mg | Zn | Ti | Zr | Cr | Bi | Li | Be | Sb | Pb | Ba | Na | Sr | In | Sn |
| B30 | Filler material | 0.01 | 0.1 | 10.0 | — | — | — | 0.073 | — | — | — | — | 0.020 | <0.004 | <0.004 | — | — | — | — | — | — | — |
| | Core material | 0.08 | | 0.33 | — | — | 1.19 | 0.140 | — | — | — | — | — | — | — | — | — | — | — | — | — | — |
| | Filler material | 0.01 | | 10.0 | — | — | — | — | — | — | — | — | 0.022 | <0.004 | <0.004 | — | — | — | — | — | — | — |
| B31 | Filler material | 0.01 | 0.1 | 10.2 | — | — | — | 0.075 | — | — | — | — | 0.021 | <0.004 | <0.004 | — | — | — | — | — | — | — |
| | Core material | 0.08 | | 0.34 | — | — | 1.18 | 0.580 | 3.53 | — | — | — | — | — | — | — | — | — | — | — | — | — |
| | Filler material | 0.01 | | 10.2 | — | — | — | 0.075 | — | — | — | — | 0.021 | <0.004 | <0.004 | — | — | — | — | — | — | — |
| B32 | Filler material | 0.01 | 0.1 | 9.9 | — | — | — | 0.078 | — | — | — | — | 0.020 | <0.004 | <0.004 | — | — | — | — | — | — | — |
| | Core material | 0.08 | | 0.36 | — | — | 1.16 | 0.610 | — | — | — | — | — | — | — | — | — | — | — | — | 0.142 | — |
| | Filler material | 0.01 | | 9.9 | — | — | — | 0.078 | — | — | — | — | 0.020 | <0.004 | <0.004 | — | — | — | — | — | — | — |

TABLE 6-continued

| Test Material Symbol | Layered Structure | Thickness (mm) Each Layer | Thickness (mm) Total | Chemical Composition (mass %) | | | | | | | | | | | | | | | | | |
|---|---|---|---|---|---|---|---|---|---|---|---|---|---|---|---|---|---|---|---|---|---|
| | | | | Si | Fe | Cu | Mn | Mg | Zn | Ti | Zr | Cr | Bi | Li | Be | Sb | Pb | Ba | Na | Sr | In | Sn |
| B33 | Filler material | 0.01 | 0.1 | 10.2 | — | — | — | 0.074 | — | — | — | — | 0.018 | <0.004 | <0.004 | — | — | — | — | — | — | — |
| | Core material | 0.08 | | 0.35 | — | — | 1.19 | 0.580 | — | — | — | — | — | — | — | — | — | — | — | — | — | 0.147 |
| | Filler material | 0.01 | | 10.2 | — | — | — | 0.074 | — | — | — | — | 0.018 | <0.004 | <0.004 | — | — | — | — | — | — | — |

TABLE 7

| Test Material Symbol | Si Particle Size (μm) | Fluidity of the Filler Fluidity Coefficient | Evaluation | Filler Erosion Characteristics |
|---|---|---|---|---|
| A1 | 4.2 | 0.58 | A | A |
| A2 | — | 0.26 | C | A |
| A3 | 4.4 | 0.71 | A | B |
| A4 | — | 0.52 | A | A |
| A5 | — | 0.62 | A | A |
| A6 | — | 0.56 | A | A |
| A7 | — | 0.64 | A | C |
| A8 | 4.1 | 0.60 | A | A |
| A9 | 4.2 | 0.63 | A | A |
| A10 | 4.0 | 0.62 | A | A |
| A11 | 3.9 | 0.64 | A | A |
| A12 | 3.9 | 0.60 | A | A |
| A13 | 4.2 | 0.62 | A | A |
| A14 | 3.1 | 0.63 | A | A |
| A15 | 2.6 | 0.65 | A | A |
| A16 | 3.2 | 0.63 | A | A |
| A17 | 2.7 | 0.64 | A | A |
| A18 | 4.0 | 0.55 | A | A |
| A19 | 4.1 | 0.54 | A | A |
| A20 | 4.1 | 0.55 | A | A |
| A21 | 2.5 | 0.57 | A | A |
| A22 | — | 0.63 | A | B |
| A23 | — | 0.62 | A | C |
| A24 | — | 0.61 | A | A |
| A25 | — | 0.60 | A | A |
| A26 | — | 0.65 | A | B |
| A27 | — | 0.73 | A | C |
| A28 | — | 0.59 | A | A |
| A29 | — | 0.58 | A | A |

TABLE 8

| Test Material Symbol | Si Particle Size (μm) | Fluidity of the Filler Fluidity Coefficient | Evaluation | Filler Erosion Characteristics |
|---|---|---|---|---|
| B1 | 4.2 | 0.18 | D | — |
| B2 | 4.1 | 0.49 | A | A |
| B3 | 3.9 | 0.51 | A | A |
| B5 | 4.3 | 0.35 | B | A |
| B6 | 3.8 | 0.55 | A | A |
| B7 | 4.4 | 0.48 | A | A |
| B8 | 4.0 | 0.56 | A | A |
| B9 | — | 0.17 | D | — |
| B10 | — | 0.67 | A | D |
| B11 | 3.6 | 0.69 | A | B |
| B12 | 3.7 | 0.68 | A | B |
| B13 | 4.0 | 0.66 | A | B |
| B14 | 2.4 | 0.42 | B | A |
| B15 | 2.6 | 0.44 | B | A |
| B16 | 4.3 | 0.49 | A | A |
| B17 | 4.2 | 0.48 | A | A |
| B18 | 4.1 | 0.47 | A | A |
| B20 | — | 0.65 | A | D |
| B21 | — | 0.61 | A | B |
| B22 | — | 0.62 | A | D |
| B23 | — | 0.57 | A | A |
| B24 | — | 0.57 | A | A |
| B25 | — | 0.56 | A | A |

As shown in Table 1 to Table 2, Test Materials A1-A29 each have a filler material and a core material having chemical compositions in the above-mentioned specified ranges. Consequently, as shown in Table 7, both characteristics, i.e., the fluidity and the erosion characteristics, of the filler were satisfactory. In addition, of these test materials, because Test Materials A8-A17 contained elements that function to improve the fluidity of the filler in the filler material, they tended to have a somewhat higher fluidity of the filler than other test materials.

On the other hand, with regard to Test Material B1 shown in Table 4, because the amount of Si in the filler material was below the above-mentioned specified range, the amount of the filler was insufficient. As a result, as shown in Table 8, it led to a decrease in the fluidity of the filler.

With regard to Test Material B9 shown in Table 4, because the amount of Mg in the core material was below the above-mentioned specified range, after melting of the filler, the oxide film on the filler surface could not be sufficiently broken down. As a result, as shown in Table 8, it led to a decrease in the fluidity of the filler.

With regard to the Test Materials B10, B20, B22 shown in Table 4 to Table 5, because the amount of any one of Mg, Si, and Cu in the core material exceeded the above-mentioned specified ranges, erosion of the core material was promoted as shown in Table 8.

It is noted that, in B2-B8, B11-B18, B21, B23-B25, both characteristics, i.e., the fluidity and the erosion characteristics, of the filler were satisfactory. However, with regard to these test materials, as described below, because brazeability in the brazeability evaluations, which were conducted using gap-filling tests and cups, was low, they were unacceptable (refer to Table 10 and Table 12).

Test Example 2

The present example is an example in which a gap-filling test was performed using test materials (Test Materials A1-A29, B1-B25) having a thickness of 0.4 mm. Test specimens 2 (refer to FIG. 2) for the gap-filling test were prepared according to the following method. First, a horizontal sheet 21, having a width of 25 mm and a length of 60 mm, was sampled from each of the test materials. Here, multiple horizontal sheets 21 were sampled from Test Material A1, and etching was performed (Test Numbers 3-8, 37-39) on some of these under the conditions shown in Table 9 and Table 10.

It is noted that the etching conditions of the present example are just one example, and etching may be performed under conditions other than those. For example, in Test Numbers 3, 6-8 shown in Table 9, etching was performed by immersion in 1% hydrofluoric acid at 20° C. for 60 sec; however, instead, etching can also be performed by immersion in a mixed solution of 2% nitric acid and 1% hydrofluoric acid for 90 sec.

Furthermore, for some of the horizontal sheets 21 that were etched, a protective oil was applied to the surface according to the conditions shown in Table 9 and Table 10 (Test Numbers 6-8, 37-39). Furthermore, the horizontal sheets 21 to which the protective oil was applied were left for 6 days in a constant temperature tank at a temperature of 50° C. and a humidity of 80%, and condensation was caused to form thereon.

Separately from these horizontal sheets 21, perpendicular sheets 22, each composed of a JIS A3003 alloy and having a width of 25 mm, a length of approximately 55 mm, and a thickness of 1 mm, were prepared. After the horizontal sheets 21 and the perpendicular sheets 22 were degreased using acetone, these were assembled as shown in FIG. 2 to prepare each test specimen 2 (Test Numbers 1-63).

Figure 2:
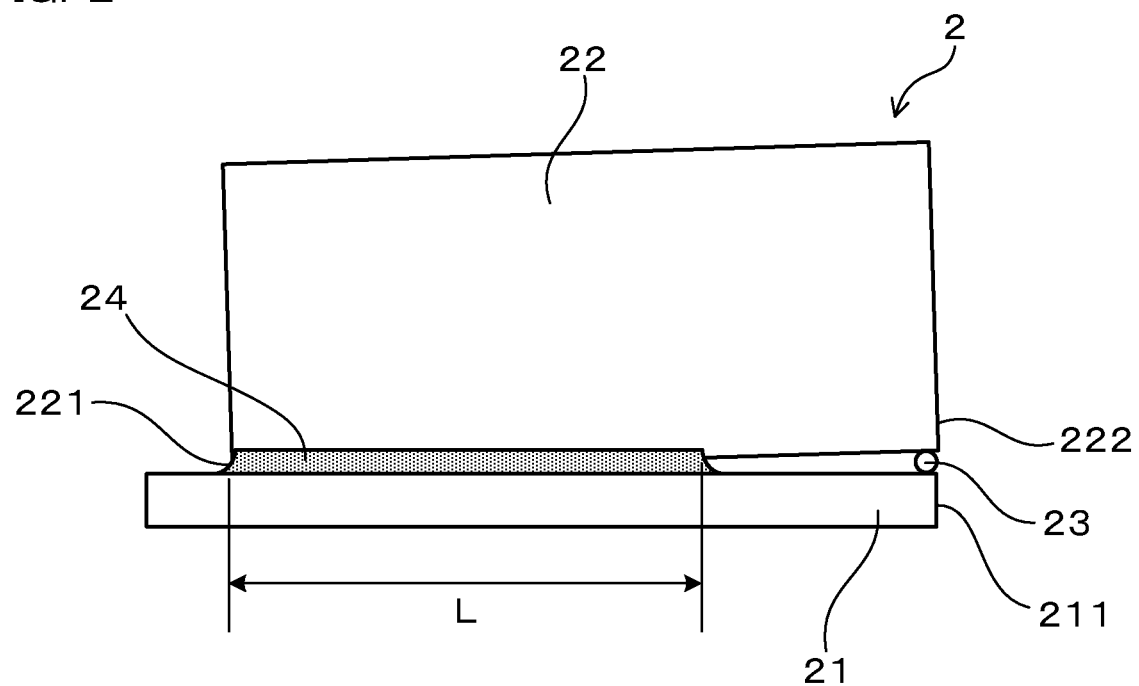
FIG. 2 is side view of a test specimen for a gap-filling test in Test Example 2.

As shown in FIG. 2, the perpendicular sheet 22 is disposed in an orientation orthogonal to the horizontal sheet 21. Although not shown in the drawing, prior to performing the brazing, one end 221 of the perpendicular sheet 22 in the longitudinal direction makes contact with the filler material of the horizontal sheet 21. In addition, a spacer 23, which is a round wire made of stainless steel and has a diameter of 1.6 mm, is interposed between the other end 222 of the perpendicular sheet 22 in the longitudinal direction and the horizontal sheet 21. More specifically, the spacer 23 is spaced apart, by 55 mm in the horizontal direction, from the location (the one end 221) at which the perpendicular sheet 22 contacts the horizontal sheet 21. In addition, when test specimen 2 is viewed from above, the other end 222 of the perpendicular sheet 22 is disposed such that it coincides with the spacer 23 and an end part 211 of the horizontal sheet 21 in the longitudinal direction.

The test specimens 2 prepared as above were brazed in a nitrogen-gas atmosphere and then the gap-filling lengths of the test specimens 2 and the external appearance of the fillets were evaluated.

A nitrogen-gas furnace, which comprises a dual-chamber furnace equipped with a preheating chamber and a brazing chamber, each having a content volume of 0.4 m³, was used for heating when brazing was performed. When the temperature of the test specimens 2 in the preheating chamber reached 450° C., the test specimens 2 were moved to the brazing chamber, in which the test specimens 2 were brazed by being heated to the ultimate temperatures shown in Table 9 and Table 10. Either normal heating, in which the time required after the temperature of the test specimens 2 reached 450° C. until they reached the above-mentioned temperature was approximately 16 min, or rapid heating, in which the required time was approximately 3 min, was used as the heating condition. In addition, the oxygen concentration inside the brazing chamber during brazing was 47-53 ppm.

At the point in time when the temperature of the test specimens 2 reached the above-mentioned temperature, the test specimens 2 were moved from the brazing chamber to the preheating chamber, and the test specimens 2 were cooled in the preheating chamber until the temperature became 570° C. Subsequently, the test specimens 2 were removed from the preheating chamber and cooled in the atmosphere.

The filling length and the external appearance of the fillet were evaluated by visually observing the brazed test specimens 2. For each test specimen 2, the length by which a filler material 24 filled between the horizontal sheet 21 and the perpendicular sheet 22 (refer to symbol L in FIG. 2) was recorded in the "filling length" column in Table 9 and Table 10. In addition, if the filling length L was 30 mm or more, then symbol "A" was recorded in the "filling characteristics evaluation" column; if the filling length L was 25 mm or more and less than 30 mm, then symbol "B" was recorded; if the filling length L was 20 mm or more and less than 25 mm, then symbol "C" was recorded; if the filling length L was 15 mm or more and less than 20 mm, then symbol "D" was recorded; and if the filling length L was less than 15 mm, then symbol "E" was recorded. In the filling characteristics evaluation, the cases of symbols A-C, in which the filling length L was 20 mm or more, were judged to be acceptable because the filler material tended to fill the gap. The cases of symbols D, E, in which the filling length L was less than 20 mm, were judged to be unacceptable because the filler material tended not to fill the gap and there was a risk of a brazing defect.

In addition, in cases in which the fillet had a uniform shape, symbol "A" was recorded in the "fillet shape evaluation" column in Table 9 and Table 10. In cases in which there was a slightly uneven portion present in the fillet shape in the longitudinal direction but the fillet on the left side of the perpendicular sheet 22 and the fillet on the right side of the perpendicular sheet 22 were equal, symbol "B" was recorded. In cases in which the fillet on the left side of the perpendicular sheet 22 and the fillet on the right side of the perpendicular sheet 22 were unequal but a continuous fillet was formed, symbol "C" was recorded.

In cases in which the fillet on the left side of the perpendicular sheet 22 and the fillet on the right side of the perpendicular sheet 22 were unequal and the fillet(s) was (were) discontinuously formed, symbol "D" was recorded. In cases in which the fillet(s) was (were) extremely small or a fillet was not formed on at least one side of the perpendicular sheet 22, symbol "E" was recorded.

In the fillet shape evaluation, the cases of symbols A-C, in which a continuous fillet was formed, were judged to be acceptable because brazeability was satisfactory. In addition, the cases of symbols D, E, in which the fillet(s) was (were) discontinuously formed or a fillet was not formed, there was a risk of brazing defect, and therefore they were judged to be unacceptable.

TABLE 9

| Test No. | Test Material Symbol | Etching Fluid Type | Etching Temperature (° C.) | Immersion Time (sec) | Protective Oil Decomposition Temperature (° C.) | Protective Oil Application Amount (mg/m2) | Condensation Process | Brazing Conditions Heating Condition | Brazing Conditions Ultimate Temperature (° C.) | Filling Length (mm) | Filling Characteristics Evaluation | Fillet Shape Evaluation | Remarks |
|---|---|---|---|---|---|---|---|---|---|---|---|---|---|
| 1 | A1 | None | None | | None | | None | Normal Heating | 600 | 26.4 | B | A | — |
| 2 | A1 | 1% hydrofluoric acid | 20 | 60 | None | | None | Rapid Heating | 600 | 23.5 | C | B | — |
| 3 | A1 | 1% hydrofluoric acid | 20 | 60 | None | | None | Rapid Heating | 600 | 28.3 | B | A | — |
| 4 | A1 | 5% NaOH | 50 | 90 | None | | None | Rapid Heating | 600 | 27.6 | B | A | — |
| 5 | A1 | 5% NaOH | 50 | 90 | None | | None | Rapid Heating | 585 | 23.8 | C | A | — |
| 6 | A1 | 1% hydrofluoric acid | 20 | 60 | 200 | 500 | Yes | Rapid Heating | 600 | 32.0 | A | A | — |
| 7 | A1 | 1% hydrofluoric acid | 20 | 60 | 380 | 500 | Yes | Rapid Heating | 600 | 32.3 | A | A | — |
| 8 | A1 | 1% hydrofluoric acid | 20 | 60 | 380 | 500 | Yes | Rapid Heating | 585 | 21.2 | C | A | — |
| 9 | A2 | | None | | None | | None | Rapid Heating | 600 | 20.4 | C | B | — |
| 10 | A3 | | None | | None | | None | Rapid Heating | 600 | 29.6 | B | B | — |
| 11 | A4 | | None | | None | | None | Rapid Heating | 600 | 20.6 | C | B | — |
| 12 | A5 | | None | | None | | None | Rapid Heating | 600 | 23.0 | C | B | — |
| 13 | A6 | | None | | None | | None | Rapid Heating | 600 | 20.9 | C | B | — |
| 14 | A7 | | None | | None | | None | Rapid Heating | 600 | 29.1 | B | B | — |
| 15 | A8 | | None | | None | | None | Rapid Heating | 600 | 30.3 | A | A | — |
| 16 | A9 | | None | | None | | None | Rapid Heating | 600 | 31.5 | A | B | — |
| 17 | A10 | | None | | None | | None | Rapid Heating | 600 | 29.0 | B | B | — |
| 18 | A11 | | None | | None | | None | Rapid Heating | 600 | 30.4 | A | B | — |
| 19 | A12 | | None | | None | | None | Rapid Heating | 600 | 30.9 | A | B | — |
| 20 | A13 | | None | | None | | None | Rapid Heating | 600 | 29.0 | B | B | — |
| 21 | A14 | | None | | None | | None | Rapid Heating | 600 | 27.8 | B | B | — |
| 22 | A15 | | None | | None | | None | Rapid Heating | 600 | 28.8 | B | B | — |
| 23 | A16 | | None | | None | | None | Rapid Heating | 600 | 30.0 | A | A | — |
| 24 | A17 | | None | | None | | None | Rapid Heating | 600 | 28.3 | B | B | — |
| 25 | A18 | | None | | None | | None | Rapid Heating | 600 | 22.8 | C | A | — |
| 26 | A19 | | None | | None | | None | Rapid Heating | 600 | 24.0 | C | A | — |
| 27 | A20 | | None | | None | | None | Rapid Heating | 600 | 24.6 | C | B | — |
| 28 | A21 | | None | | None | | None | Rapid Heating | 600 | 31.2 | A | B | — |
| 29 | A22 | | None | | None | | None | Rapid Heating | 600 | 29.7 | B | B | — |
| 30 | A23 | | None | | None | | None | Rapid Heating | 600 | 28.1 | B | B | — |
| 31 | A24 | | None | | None | | None | Rapid Heating | 600 | 26.4 | B | B | — |
| 32 | A25 | | None | | None | | None | Rapid Heating | 600 | 26.6 | B | B | — |
| 33 | A26 | | None | | None | | None | Rapid Heating | 600 | 29.3 | B | B | — |
| 34 | A27 | | None | | None | | None | Rapid Heating | 600 | 33.0 | A | B | — |
| 35 | A28 | | None | | None | | None | Rapid Heating | 600 | 26.9 | B | B | — |
| 36 | A29 | | None | | None | | None | Rapid Heating | 600 | 27.0 | B | B | — |

TABLE 10

| Test No. | Test Material Symbol | Etching Fluid Type | Etching Temperature (° C.) | Etching Immersion Time (sec) | Protective Oil Decomposition Temperature (° C.) | Protective Oil Application Amount (mg/m²) | Condensation Process |
|---|---|---|---|---|---|---|---|
| 37 | A1 | 1% hydrofluoric acid | 20 | 60 | 300 | 350 | Present |
| 38 | A1 | 1% hydrofluoric acid | 20 | 60 | 150 | 500 | Present |
| 39 | A1 | 1% hydrofluoric acid | 20 | 60 | 450 | 500 | Present |
| 40 | B1 | None | | | None | | None |
| 41 | B2 | None | | | None | | None |
| 42 | B3 | None | | | None | | None |
| 43 | B5 | None | | | None | | None |
| 44 | B5 | None | | | None | | None |
| 45 | B6 | None | | | None | | None |
| 46 | B7 | None | | | None | | None |
| 47 | B8 | None | | | None | | None |
| 48 | B9 | None | | | None | | None |
| 49 | B10 | None | | | None | | None |
| 50 | B11 | None | | | None | | None |
| 51 | B12 | None | | | None | | None |
| 52 | B13 | None | | | None | | None |
| 53 | B14 | None | | | None | | None |
| 54 | B15 | None | | | None | | None |
| 55 | B16 | None | | | None | | None |
| 56 | B17 | None | | | None | | None |
| 57 | B18 | None | | | None | | None |
| 58 | B20 | None | | | None | | None |
| 59 | B21 | None | | | None | | None |
| 60 | B22 | None | | | None | | None |
| 61 | B23 | None | | | None | | None |
| 62 | B24 | None | | | None | | None |
| 63 | B25 | None | | | None | | None |

| Test No. | Brazing Conditions Heating Condition | Ultimate Temperature (° C.) | Filling Length (mm) | Filling Characteristics Evaluation | Fillet Shape Evaluation | Remarks |
|---|---|---|---|---|---|---|
| 37 | Rapid Heating | 600 | 19.6 | D | C | — |
| 38 | Rapid Heating | 600 | 22.2 | C | D | — |
| 39 | Rapid Heating | 600 | 17.0 | D | D | — |
| 40 | Rapid Heating | 600 | 13.8 | D | B | — |
| 41 | Rapid Heating | 600 | 25.5 | B | D | — |
| 42 | Rapid Heating | 600 | 24.7 | C | D | — |
| 43 | Rapid Heating | 600 | 24.0 | C | D | — |
| 44 | Rapid Heating | 585 | 9.4 | E | E | — |
| 45 | Rapid Heating | 600 | 28.6 | B | D | — |
| 46 | Rapid Heating | 600 | 22.3 | C | D | — |
| 47 | Rapid Heating | 600 | 27.0 | B | D | — |
| 48 | Rapid Heating | 600 | 16.6 | D | C | — |
| 49 | Rapid Heating | 600 | 19.2 | D | B | Much erosion |
| 50 | Rapid Heating | 600 | 25.6 | B | D | — |
| 51 | Rapid Heating | 600 | 25.9 | B | D | — |
| 52 | Rapid Heating | 600 | 25.1 | B | D | — |
| 53 | Rapid Heating | 600 | 21.1 | C | E | — |
| 54 | Rapid Heating | 600 | 23.0 | C | D | — |
| 55 | Rapid Heating | 600 | 23.3 | C | B | — |
| 56 | Rapid Heating | 600 | 24.9 | C | B | — |
| 57 | Rapid Heating | 600 | 24.9 | C | B | — |
| 58 | Rapid Heating | 600 | 18.5 | D | B | Lots of erosion |
| 59 | Rapid Heating | 600 | 25.7 | B | B | — |
| 60 | Rapid Heating | 600 | 18.1 | D | B | Lots of erosion |
| 61 | Rapid Heating | 600 | 24.6 | B | B | — |
| 62 | Rapid Heating | 600 | 24.7 | B | B | — |
| 63 | Rapid Heating | 600 | 24.3 | B | B | — |

Because Test Materials A1-A29 each have the filler material and the core material having chemical compositions in the above-mentioned specified ranges, both the filling characteristics evaluation and the fillet shape evaluation were satisfactory (Test Nos. 1-36) as shown in Table 9.

In addition, from a comparison of Test Nos. 2-5, it can be understood that brazeability improved by performing an etching of the brazing sheet and that a satisfactory fillet could be formed even if the temperature-rise rate was speeded up. With regard to the brazing sheets that were etched, satisfactory fillets could be formed even under strict conditions such as rapid heating and a low ultimate temperature as in Test No. 5.

Furthermore, with regard to the test specimens 2, which used the horizontal sheet 21 on which the above-specified protective oil was applied, even in cases in which brazing was performed after condensation was caused to form on the horizontal sheet 21, satisfactory fillets could be formed (Test Nos. 6-8), the same as prior to causing condensation to form. It could be understood from these results that, by applying the above-specified protective oil to the brazing sheet, degradation in brazeability due to condensation or the like could be curtailed.

On the other hand, in cases in which the decomposition temperature, the application amount, or the like of the protective oil did not satisfy the above-mentioned specified ranges, at least one of the filling characteristics evaluation and the fillet shape evaluation was unacceptable as shown in Table 10, and the effects of the protective oil were not obtained (Test Nos. 37-39).

In addition, with regard to Test Materials B1-B15, B20, B22, because any one of the elements of the chemical compositions of the filler material and the core material deviated from the above-mentioned specified ranges, at least one of the filling characteristics evaluation and the fillet shape evaluation was unacceptable (Test Nos. 40-54, 58 and 60).

It is noted that, with regard to Test Materials B16-B18, B21, B23-B25, both the filling characteristic evaluation and the fillet shape evaluation were acceptable (Test Nos. 55-57, 59, 61-63). However, these test materials were unacceptable in the brazeability evaluation performed using cups, as will be described below (refer to Table 12).

Test Example 3

The present example is an example in which the brazeability evaluation was performed using cups composed of test materials (Test Materials A1-A29, B1-B25) having a thickness of 0.4 mm. Test specimens 3 (refer to FIGS. 3 and FIG. 4), which were used in the brazeability evaluation of the present example, were prepared according to the following method. First, sheet materials, which were sampled from the test materials, were press worked to prepare the circular cups 31 shown in FIG. 3 and FIG. 4. The diameter of the cups 31 was set to 30 mm, and a vent 312, having a diameter of 5 mm, was formed in the center of a bottom part 311 of the cups 31. A flange 313 was formed on an outer-circumferential edge portion of the cups 31. In addition, the cups 31 were formed such that the filler material was on the inner side.

With regard to the cups 31 composed of Test Material A1, some of them were etched and protective oil was applied to some of them (Table 11 to Table 12, Test Nos. 104-107, 139-141), the same as in Test Example 2.

With regard to Test Material B21, because the amount of Fe in the core material was above the above-mentioned specified range, cracks occurred during formation of the cups 31 (Table 12, Test No 160). In addition, with regard to Test Materials B23-B25, because the amount of any one of Ti, Zr, and Cr in the core material was above the above-mentioned specified range, microcracks occurred (Test Nos. 162-164) during formation of the cups 31. For this reason, the brazeability evaluation was halted for these test materials.

Separate from these cups 31, corrugated fins 32 composed of JIS A3003 alloy were prepared.

Figure 3:
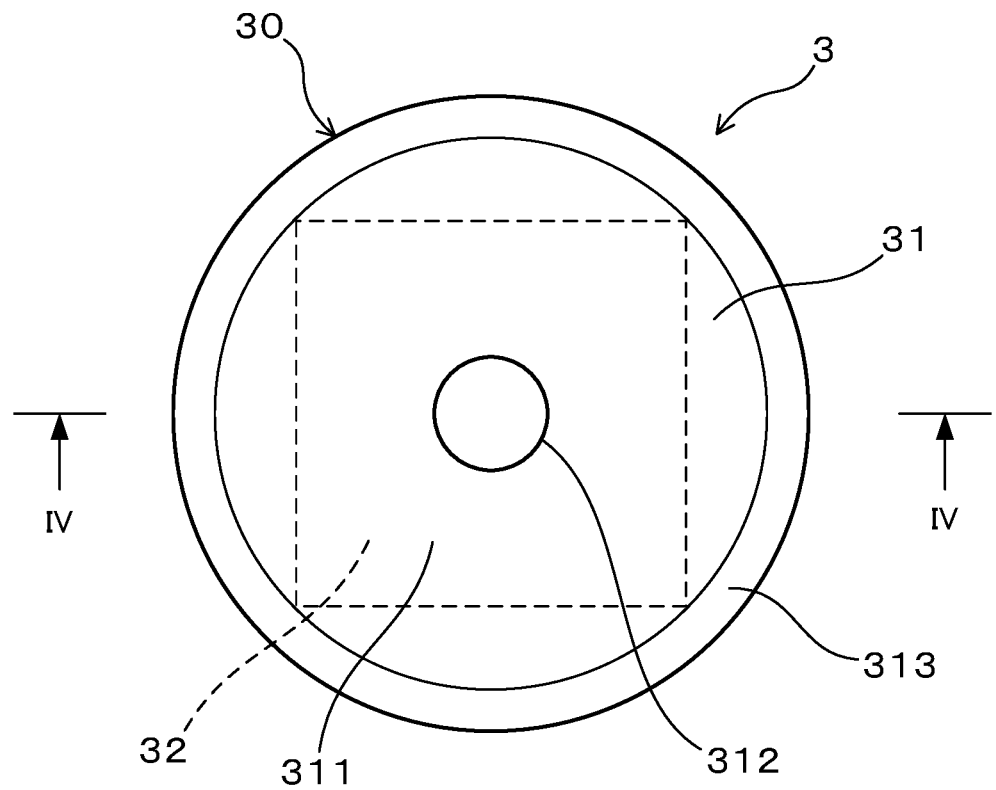
FIG. 3 is a plan view of a cup test specimen for the brazeability evaluation in Test Example 3.
Figure 4:
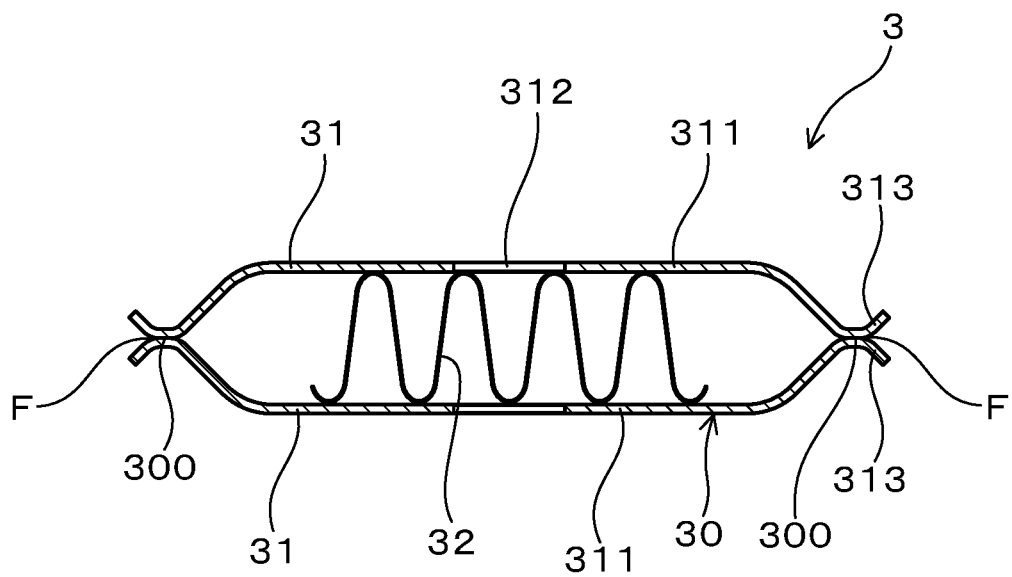
FIG. 4 is a cross-sectional view taken along line IV-IV in FIG. 3.

After the cups 31 and the corrugated fins 32 were degreased, the two cups 31 and a corrugated fin 32 were combined to assemble the test specimen 3 shown in FIGS. 3 and 4. The test specimen 3 comprises a hollow member 30, which comprises two of the cups 31, and a corrugated fin 32, which is disposed in the interior of the hollow member 30. The hollow member 30 has a contact portion 300, along which the flanges 313 of the cups 31 contact one another. In addition, the corrugated fin 32 makes contact with the bottom part 311 of each cup 31.

The test specimens 3 prepared as above were brazed in an inert gas atmosphere (Test Nos. 101-164). At this time, either a normal orientation, in which the contact portion 300 was disposed in the horizontal plane, or an erect orientation, in which the contact portion 300 was disposed in the vertical plane, was used as the orientation of the test specimens 3 in the brazing chamber. It is noted that conditions other than those were the same as in Test Example 2. The oxygen concentration inside the brazing chamber during brazing was 36-42 ppm.

After brazing, the test specimens 3 were visually observed, and the external appearance of a fillet F (refer to FIG. 4), which formed on an outer side of the contact portion 300, was evaluated. In cases in which the fillet had a uniform shape, symbol "A" was recorded in the "fillet shape evaluation" column in Table 11 and Table 12. In cases in which the fillet shape had a somewhat uneven portion but a continuous fillet was formed, symbol "B" was recorded. In cases in which the size of the fillet was small or the size of the fillet was irregular but a continuous fillet was formed, symbol "C" was recorded.

In cases in which a stitch was produced on the outer side of the contact portion 300, symbol "D" was recorded. In cases in which a fillet was not formed on the outer side of the contact portion 300, symbol "E" was recorded. Here, the above-mentioned "stitch" refers to the state in which the fillet was discontinuously formed, that is, the state in which the fillet is intermittent due to pinhole-shaped defects or the like, and it looks like a seam. A stitch does not necessarily lead to the occurrence of leakage of the contents from the hollow member 30; however, they are often handled, together with cases in which a fillet is not formed, as defective products owing to the effect on the joint quality of the product.

In the fillet shape evaluation, the cases of symbols A-C, in which a continuous fillet was formed, were judged to be acceptable because satisfactory fillets were formed. In addition, the cases of symbols D, E, in which a stitch occurred or a fillet was not formed, were judged to be unacceptable because of the risk of a brazing defect.

TABLE 11

| Test No. | Test Material Symbol | Etching Fluid Type | Etching Temperature (° C.) | Etching Immersion Time (sec) | Protective Oil Decomposition Temperature (° C.) | Protective Oil Application Amount (mg/m2) | Condensation Process |
|---|---|---|---|---|---|---|---|
| 101 | A1 | | None | | | None | None |
| 102 | A1 | | None | | | None | None |
| 103 | A1 | | None | | | None | None |
| 104 | A1 | 1% hydrofluoric acid | 20 | 60 | | None | None |
| 105 | A1 | 5% NaOH | 50 | 90 | | None | None |
| 106 | A1 | 1% hydrofluoric acid | 20 | 60 | 200 | 500 | Present |
| 107 | A1 | 1% hydrofluoric acid | 20 | 60 | 380 | 500 | Present |
| 108 | A2 | | None | | | None | None |
| 109 | A3 | | None | | | None | None |
| 110 | A4 | | None | | | None | None |
| 111 | A5 | | None | | | None | None |
| 112 | A6 | | None | | | None | None |
| 113 | A7 | | None | | | None | None |
| 114 | A8 | | None | | | None | None |
| 115 | A9 | | None | | | None | None |
| 116 | A10 | | None | | | None | None |
| 117 | A11 | | None | | | None | None |
| 118 | A12 | | None | | | None | None |
| 119 | A13 | | None | | | None | None |
| 120 | A14 | | None | | | None | None |
| 121 | A15 | | None | | | None | None |
| 122 | A16 | | None | | | None | None |
| 123 | A17 | | None | | | None | None |
| 124 | A18 | | None | | | None | None |
| 125 | A18 | | None | | | None | None |
| 126 | A19 | | None | | | None | None |
| 127 | A19 | | None | | | None | None |
| 128 | A20 | | None | | | None | None |
| 129 | A20 | | None | | | None | None |
| 130 | A21 | | None | | | None | None |
| 131 | A22 | | None | | | None | None |
| 132 | A23 | | None | | | None | None |
| 133 | A24 | | None | | | None | None |

| Test No. | Orientation During Brazing | Heating Condition | Brazing Conditions Ultimate Temperature (° C.) | Fillet Shape Evaluation | Remarks |
|---|---|---|---|---|---|
| 101 | Normal Orientation | Normal Heating | 600 | B | — |
| 102 | Erect Orientation | Normal Heating | 600 | C | — |
| 103 | Normal Orientation | Rapid Heating | 600 | C | — |
| 104 | Normal Orientation | Rapid Heating | 600 | A | — |
| 105 | Normal Orientation | Rapid Heating | 600 | A | — |
| 106 | Normal Orientation | Rapid Heating | 600 | A | — |
| 107 | Normal Orientation | Rapid Heating | 600 | B | — |
| 108 | Normal Orientation | Rapid Heating | 600 | C | — |
| 109 | Normal Orientation | Rapid Heating | 600 | B | — |
| 110 | Normal Orientation | Rapid Heating | 600 | B | — |
| 111 | Normal Orientation | Rapid Heating | 600 | B | — |
| 112 | Normal Orientation | Rapid Heating | 600 | C | — |
| 113 | Normal Orientation | Rapid Heating | 600 | B | — |
| 114 | Normal Orientation | Rapid Heating | 600 | A | — |
| 115 | Normal Orientation | Rapid Heating | 600 | B | — |

TABLE 11-continued

| | | | | | | |
|---|---|---|---|---|---|---|
| 116 | Normal Orientation | Rapid Heating | 600 | A | — | |
| 117 | Normal Orientation | Rapid Heating | 600 | B | — | |
| 118 | Normal Orientation | Rapid Heating | 600 | B | — | |
| 119 | Normal Orientation | Rapid Heating | 600 | B | — | |
| 120 | Normal Orientation | Rapid Heating | 600 | B | — | |
| 121 | Normal Orientation | Rapid Heating | 600 | B | — | |
| 122 | Normal Orientation | Rapid Heating | 600 | B | — | |
| 123 | Normal Orientation | Rapid Heating | 600 | B | — | |
| 124 | Normal Orientation | Normal Heating | 600 | B | — | |
| 125 | Erect Orientation | Normal Heating | 600 | C | — | |
| 126 | Normal Orientation | Normal Heating | 600 | B | — | |
| 127 | Erect Orientation | Normal Heating | 600 | C | — | |
| 128 | Normal Orientation | Normal Heating | 600 | B | — | |
| 129 | Erect Orientation | Normal Heating | 600 | C | — | |
| 130 | Normal Orientation | Rapid Heating | 600 | A | — | |
| 131 | Normal Orientation | Rapid Heating | 600 | B | — | |
| 132 | Normal Orientation | Rapid Heating | 600 | B | — | |
| 133 | Normal Orientation | Rapid Heating | 600 | B | — | |

TABLE 12

| | | Etching | | | Protective Oil | | |
|---|---|---|---|---|---|---|---|
| Test No. | Test Material Symbol | Fluid Type | Temperature (° C.) | Immersion Time (sec) | Decomposition Temperature (° C.) | Application Amount (mg/m2) | Condensation Process |
| 134 | A25 | | None | | None | | None |
| 135 | A26 | | None | | None | | None |
| 136 | A27 | | None | | None | | None |
| 137 | A28 | | None | | None | | None |
| 138 | A29 | | None | | None | | None |
| 139 | A1 | 1% hydrofluoric acid | 20 | 60 | 300 | 350 | Present |
| 140 | A1 | 1% hydrofluoric acid | 20 | 60 | 150 | 500 | Present |
| 141 | A1 | 1% hydrofluoric acid | 20 | 60 | 450 | 500 | Present |
| 142 | B1 | | None | | None | | None |
| 143 | B2 | | None | | None | | None |
| 144 | B3 | | None | | None | | None |
| 145 | B5 | | None | | None | | None |
| 146 | B6 | | None | | None | | None |
| 147 | B7 | | None | | None | | None |
| 148 | B8 | | None | | None | | None |
| 149 | B9 | | None | | None | | None |
| 150 | B10 | | None | | None | | None |
| 151 | B11 | | None | | None | | None |
| 152 | B12 | | None | | None | | None |
| 153 | B13 | | None | | None | | None |
| 154 | B14 | | None | | None | | None |
| 155 | B15 | | None | | None | | None |
| 156 | B16 | | None | | None | | None |
| 157 | B17 | | None | | None | | None |
| 158 | B18 | | None | | None | | None |
| 159 | B20 | | None | | None | | None |
| 160 | B21 | | None | | None | | None |
| 161 | B22 | | None | | None | | None |
| 162 | B23 | | None | | None | | None |

TABLE 12-continued

| | | | | | |
|---|---|---|---|---|---|
| 163 | B24 | None | None | None | |
| 164 | B25 | None | None | None | |

| | | Brazing Conditions | | | |
|---|---|---|---|---|---|
| Test No. | Orientation During Brazing | Heating Condition | Ultimate Temperature (° C.) | Fillet-Shape Evaluation | Remarks |
| 134 | Normal Orientation | Rapid Heating | 600 | B | — |
| 135 | Normal Orientation | Rapid Heating | 600 | B | — |
| 136 | Normal Orientation | Rapid Heating | 600 | B | — |
| 137 | Normal Orientation | Rapid Heating | 600 | B | — |
| 138 | Normal Orientation | Rapid Heating | 600 | B | — |
| 139 | Normal Orientation | Rapid Heating | 600 | D | — |
| 140 | Normal Orientation | Rapid Heating | 600 | D | — |
| 141 | Normal Orientation | Rapid Heating | 600 | E | — |
| 142 | Normal Orientation | Rapid Heating | 600 | D | — |
| 143 | Normal Orientation | Rapid Heating | 600 | D | — |
| 144 | Normal Orientation | Rapid Heating | 600 | D | — |
| 145 | Normal Orientation | Rapid Heating | 600 | D | — |
| 146 | Normal Orientation | Rapid Heating | 600 | D | — |
| 147 | Normal Orientation | Rapid Heating | 600 | D | — |
| 148 | Normal Orientation | Rapid Heating | 600 | D | — |
| 149 | Normal Orientation | Rapid Heating | 600 | E | — |
| 150 | Normal Orientation | Rapid Heating | 600 | D | — |
| 151 | Normal Orientation | Rapid Heating | 600 | D | — |
| 152 | Normal Orientation | Rapid Heating | 600 | D | — |
| 153 | Normal Orientation | Rapid Heating | 600 | D | — |
| 154 | Normal Orientation | Rapid Heating | 600 | D | — |
| 155 | Erect Orientation | Normal Heating | 600 | D | — |
| 156 | Erect Orientation | Normal Heating | 600 | D | — |
| 157 | Erect Orientation | Normal Heating | 600 | D | — |
| 158 | Normal Orientation | Rapid Heating | 600 | D | — |
| 159 | Normal Orientation | Rapid Heating | 600 | D | — |
| 160 | — | — | 600 | — | Cracks occurred during cup formation |
| 161 | Normal Orientation | Rapid Heating | 600 | D | — |
| 162 | — | — | 600 | — | Micro-cracks occurred during cup formation |
| 163 | — | — | 600 | — | Micro-cracks occurred during cup formation |
| 164 | — | — | 600 | — | Micro-cracks occurred during cup formation |

Because Test Materials A1-A29 each had a filler material and a core material having chemical compositions in the above-mentioned specified ranges, a satisfactory fillet was formed also on the outer side of the contact portion 300 of the hollow member 30 (Test Nos. 101-138), as shown in Table 11 and Table 12. In addition, the same as in Test Example 2, the brazeability improvement effect owing to the etching and the deterioration inhibiting effect on the brazing sheets owing to the application of the above-specified protective oil could be confirmed (Test Nos. 103-107).

On the other hand, as shown in Table 12, in cases in which the decomposition temperature, the application amount, or the like of the protective oil did not satisfy the above-mentioned specified ranges, a protective oil effect was not obtained (Test Nos. 139-141).

With regard to Test Materials B1-B20, B22, because any one element from among the chemical compositions of the filler material and the core material deviated from the above-mentioned specified ranges, filler was drawn into the interior of the hollow member 30 during brazing. As a result, the amount of filler on the outer side of the contact portion 300 of the hollow member 30 was insufficient, which led to degradation in brazeability (Test Nos. 142-159, 161).

Test Example 4

Figure 5:
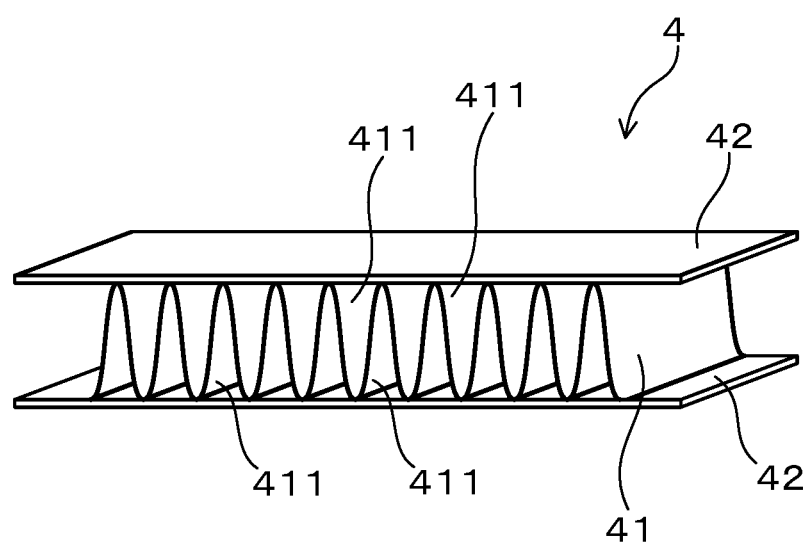
FIG. 5 is an oblique view of a mini-core test specimen for the brazeability evaluation in Test Example 4.

The present example is an example in which the brazeability evaluation was performed using test materials (Test Materials A30-A38, B30-B31) having a thickness of 0.1 mm, and using mini-cores 4, which simulate a core part of a heat exchanger. The mini-core 4 of the present example, as shown in FIG. 5, comprises a corrugated fin 41, which is composed of a test material, and two flat sheets 42, which sandwich the corrugated fin 41. The two flat sheets 42 are composed of a JIS A3003 alloy. Each flat sheet 42 has a length of 60 mm and a width of 25 mm; the spacing between the flat sheets 42 is 10 mm. In addition, the length of the corrugated fin 41 is 50 mm.

More specifically, the assembly of the mini-core 4 was carried out as described in the following. First, after a test material was cut to the prescribed dimensions, the test material was corrugated to prepare a corrugated fin 41. Here, for one piece of a test material, the corrugated fin 41 was immersed in a mixed solution of 2% nitric acid and 1% hydrofluoric acid held at 20° C. for 90 seconds, and then etched (Table 13, Test No. 203). In addition, separate from the preparation of the corrugated fins 41, the flat sheets 42, each having the above-mentioned shape, were prepared from a sheet material of a 3003 alloy. Then, these components were degreased using acetone and assembled into the mini-core 4 shown in FIG. 5.

As shown in Table 13, brazing of the mini-cores 4 was performed in an atmosphere either of an inert gas or in a vacuum. Brazing in an inert gas atmosphere was performed (Test Nos. 201-205 and 211-212) under conditions the same as in Test Example 2. The oxygen concentration in the brazing chamber during brazing was 44-50 ppm. A vacuum furnace was used for brazing in a vacuum (Test Nos. 206-210). Specifically, after the mini-cores 4 were disposed inside the vacuum furnace, the interior of the furnace was depressurized to $3 \times 10^{-3}$-$4 \times 10^{-3}$ Pa. Subsequently, brazing of the mini-core 4 was performed by heating to 600° C. under heating conditions in which the time required from 450° C. to 600° C. was approximately 20 min.

After brazing, the corrugated fins 41 were cut from the mini-cores 4 and, based on traces of the fillet present on the two flat sheets 42, the bonding percentage was calculated according to the following method. First, the lengths of the trace of the fillets in the width direction of the flat sheet 42 were measured, and the total thereof was calculated. Separate from this, the total of the lengths of the fillets, for a case in which it was assumed that the flat sheets 42 and the corrugated fin 41 were perfectly joined, in the sheet-width direction was calculated. Then, a ratio of the former value to the latter value was computed as the bonding percentage (%). It is noted that the latter value was calculated by, for example, multiplying the width of the corrugated fin 41 by the number of peak parts 411 (refer to FIG. 5) of the corrugated fin 41, that is, the number of portions at which the corrugated fin 41 is joined to the flat sheets 42.

The bonding percentages of the test materials are as shown in Table 13. In addition, in cases in which the bonding percentage was 100%, symbol "A" was recorded in the "evaluation" column of the same table; in cases in which the bonding percentage was 95% or more and less than 100%, symbol "B" was recorded; in cases in which the bonding percentage was 90% or more and less than 95%, symbol "C" was recorded; and in cases in which the bonding percentage was less than 90%, symbol "D" was recorded. In the brazeability evaluation of the mini-cores, the cases of symbols A-C, in which the bonding percentage was 90% or more, were judged to be acceptable because brazeability was satisfactory. In addition, the case of symbol D, in which the bonding percentage was less than 90%, was judged to be unacceptable because of the risk of a brazing defect.

TABLE 13

| Test No. | Test Material Symbol | Etching | | | Brazing Conditions | | | Bonding Percentage (%) | Bonding Characteristic Evaluation | Remarks |
| | | Fluid Type | Temperature (° C.) | Immersion Time (sec) | Brazing Atmosphere | Heating Condition | Ultimate Temperature (° C.) | | | |
| --- | --- | --- | --- | --- | --- | --- | --- | --- | --- | --- |
| 201 | A30 | None | | | Inert gas | Rapid Heating | 600 | 97 | B | — |
| 202 | A31 | None | | | Inert gas | Rapid Heating | 600 | 93 | C | — |
| 203 | A31 | 2% nitric acid + 1% hydrofluoric acid | 20 | 90 | Inert gas | Rapid Heating | 600 | 98 | B | — |
| 204 | A32 | None | | | Inert gas | Rapid Heating | 600 | 100 | A | — |
| 205 | A33 | None | | | Inert gas | Rapid Heating | 600 | 100 | A | — |
| 206 | A34 | None | | | Vacuum | — | 600 | 98 | B | — |
| 207 | A35 | None | | | Vacuum | — | 600 | 100 | A | — |
| 208 | A36 | None | | | Vacuum | — | 600 | 100 | A | — |
| 209 | A37 | None | | | Vacuum | — | 600 | 96 | B | — |

TABLE 13-continued

| Test No. | Test Material Symbol | Etching Fluid Type | Temperature (° C.) | Immersion Time (sec) | Brazing Atmosphere | Heating Condition | Ultimate Temperature (° C.) | Bonding Percentage (%) | Bonding Characteristic Evaluation | Remarks |
|---|---|---|---|---|---|---|---|---|---|---|
| 210 | A38 | | | None | Vacuum | — | 600 | 100 | A | — |
| 211 | B30 | | | None | Inert gas | Rapid Heating | 600 | 72 | D | — |
| 212 | B31 | | | None | Inert gas | Rapid Heating | 600 | 46 | D | Fin buckling |

As shown in Table 13, Test Materials A30-A33, which were used in brazing in an inert gas atmosphere, each contained Si, Mg, Bi in amounts that were on the same order as A34-A38, which were used in brazing in a vacuum. In addition, as shown in Table 13, brazeability of these test materials was satisfactory (Test Nos. 201-210). From these results, it could be easily understood that brazing sheets having chemical compositions in the above-mentioned specified ranges exhibited satisfactory brazeability both in an inert gas atmosphere and in a vacuum.

On the other hand, with regard to Test Material B30, the amount of Mg in the core material was below the above-mentioned specified range. Consequently, the breakdown of the oxide film after melting of the filler was insufficient, which led to degradation in brazeability.

With regard to Test Material B31, the Zn content in the core material was above the above-mentioned specified range. Consequently, the melting point of the core material dropped, and buckling of the corrugated fin occurred during brazing.

Test Example 5

The present example is an example in which the corrosion resistance of test materials after brazing was evaluated. As shown in Table 14 and Table 15, for test materials (Test Materials A1-A29, B1-B29) having a thickness of 0.4 mm, evaluations were performed using test specimens sampled from a single sheet; for test materials (Test Materials A30-A38, B30-B33) having a thickness of 0.1 mm, evaluations were performed in which mini-cores served as the test specimens. The specific methods of sampling the test specimens were as follows.

Test Materials Having a Thickness of 0.4 mm

A sheet material having a width of 50 mm and a length of 150 mm was sampled from each test material. At this time, multiple sheet materials were sampled for Test Material A1, and some of the sheet materials among these were etched (Test Nos. 302-305, 343-345) under the conditions shown in Table 14 and Table 15. These sheet materials were heated under conditions the same as in Test Example 1, and the filler material was thereby melted. From each resulting sheet material, the portion 14 (refer to FIG. 1), at which the filler material did not pool, was sampled and used as the test specimen.

Test Materials Having a Thickness of 0.1 mm

Mini-cores 4 (refer to FIG. 5) were assembled by the same method as in Test Example 4 and then brazed. The mini-cores 4 after brazing were used as the test specimens. It is noted that the brazing atmospheres were as shown in Table 14 and Table 15.

A salt-spray test was performed, using a method that conforms to JIS Z2371, on the test specimens obtained as described above. In the salt-spray test, a 5% aqueous solution of NaCl at a pH of 6.8 was used as the test solution and the test temperature was set to 35° C. After completion of the test, corrosion resistance was evaluated by observing a cross section of a corroded portion or that occurred in each test specimen. It is noted that, in Test Materials A28, A29, B28, B29, in which a sacrificial anode material was layered on the core material, the corrosion resistance was evaluated based on the state of a corroded portion produced on the sacrificial anode material (Test Nos. 332, 333, 371, 372). In addition, the corrosion resistance of the other test materials was evaluated based on the state of a corroded portion produced on the filler material.

In cases in which the maximum corrosion depth was half or less of the thickness of the filler material or of the sacrificial anode material prior to conducting the test, symbol "A" was recorded in the "corrosion resistance evaluation" column in Table 14 and Table 15; for cases in which the maximum corrosion depth exceeded half the thickness of the filler material or of the sacrificial anode material prior to conducting the test but the corrosion did not reach the core material, symbol "B" was recorded; and in cases in which the corrosion reached the core material, symbol "C" was recorded. In the corrosion resistance evaluation, the cases of symbols A, B, in which the amount of corrosion was sufficiently small, were judged to be acceptable. In addition, the case of symbol C, in which the amount of corrosion was large or pitting corrosion or the like occurred, was judged to be unacceptable.

TABLE 14

| Test No. | Test Material Symbol | Test Specimen Shape | Etching Fluid Type | Temperature (° C.) | Immersion Time (sec) | Protective Oil Decomposition Temperature (° C.) | Application Amount (mg/m2) | Brazing Atmosphere | Corrosion Resistance Evaluation | Remarks |
|---|---|---|---|---|---|---|---|---|---|---|
| 301 | A1 | Single Sheet | None | | | None | | Inert gas | B | — |
| 302 | A1 | Single Sheet | 1% hydrofluoric acid | 20 | 60 | None | | Inert gas | B | — |

TABLE 14-continued

|  |  |  | Etching | | | Protective Oil | | | | |
| --- | --- | --- | --- | --- | --- | --- | --- | --- | --- | --- |
| Test No. | Test Material Symbol | Test Specimen Shape | Fluid Type | Temperature (° C.) | Immersion Time (sec) | Decomposition Temperature (° C.) | Application Amount (mg/m2) | Brazing Atmosphere | Corrosion Resistance Evaluation | Remarks |
| 303 | A1 | Single Sheet | 5% NaOH | 50 | 90 | None | | Inert gas | B | — |
| 304 | A1 | Single Sheet | 1% hydrofluoric acid | 20 | 60 | 200 | 500 | Inert gas | B | — |
| 305 | A1 | Single Sheet | 1% hydrofluoric acid | 20 | 60 | 380 | 500 | Inert gas | B | — |
| 306 | A2 | Single Sheet | None | | | None | | Inert gas | B | — |
| 307 | A3 | Single Sheet | None | | | None | | Inert gas | B | — |
| 308 | A4 | Single Sheet | None | | | None | | Inert gas | B | — |
| 309 | A5 | Single Sheet | None | | | None | | Inert gas | B | — |
| 310 | A6 | Single Sheet | None | | | None | | Inert gas | B | — |
| 311 | A7 | Single Sheet | None | | | None | | Inert gas | B | — |
| 312 | A8 | Single Sheet | None | | | None | | Inert gas | B | — |
| 313 | A9 | Single Sheet | None | | | None | | Inert gas | B | — |
| 314 | A10 | Single Sheet | None | | | None | | Inert gas | B | — |
| 315 | A11 | Single Sheet | None | | | None | | Inert gas | B | — |
| 316 | A12 | Single Sheet | None | | | None | | Inert gas | B | — |
| 317 | A13 | Single Sheet | None | | | None | | Inert gas | B | — |
| 318 | A14 | Single Sheet | None | | | None | | Inert gas | B | — |
| 319 | A15 | Single Sheet | None | | | None | | Inert gas | B | — |
| 320 | A16 | Single Sheet | None | | | None | | Inert gas | B | — |
| 321 | A17 | Single Sheet | None | | | None | | Inert gas | B | — |
| 322 | A18 | Single Sheet | None | | | None | | Inert gas | B | — |
| 323 | A19 | Single Sheet | None | | | None | | Inert gas | B | — |
| 324 | A20 | Single Sheet | None | | | None | | Inert gas | B | — |
| 325 | A21 | Single Sheet | None | | | None | | Inert gas | B | — |
| 326 | A22 | Single Sheet | None | | | None | | Inert gas | B | — |
| 327 | A23 | Single Sheet | None | | | None | | Inert gas | B | — |
| 328 | A24 | Single Sheet | None | | | None | | Inert gas | B | — |
| 329 | A25 | Single Sheet | None | | | None | | Inert gas | A | — |
| 330 | A26 | Single Sheet | None | | | None | | Inert gas | A | — |
| 331 | A27 | Single Sheet | None | | | None | | Inert gas | B | — |
| 332 | A28 | Single Sheet | None | | | None | | Inert gas | A | Judged on the sacrificial side |
| 333 | A29 | Single Sheet | None | | | None | | Inert gas | A | Judged on the sacrificial side |
| 334 | A30 | Mini-core | None | | | None | | Inert gas | B | — |
| 335 | A31 | Mini-core | None | | | None | | Inert gas | B | — |
| 336 | A32 | Mini-core | None | | | None | | Inert gas | A | — |
| 337 | A33 | Mini-core | None | | | None | | Inert gas | A | — |
| 338 | A34 | Mini-core | None | | | None | | Vacuum | A | — |
| 339 | A35 | Mini-core | None | | | None | | Vacuum | A | — |
| 340 | A36 | Mini-core | None | | | None | | Vacuum | A | — |
| 341 | A37 | Mini-core | None | | | None | | Vacuum | A | — |
| 342 | A38 | Mini-core | None | | | None | | Vacuum | A | — |

TABLE 15

| Test No. | Test Material Symbol | Test Specimen Shape | Etching Fluid Type | Temperature (° C.) | Immersion Time (sec) | Protective Oil Decomposition Temperature (° C.) | Application Amount (mg/m2) | Brazing Atmosphere | Corrosion Resistance Evaluation | Remarks |
|---|---|---|---|---|---|---|---|---|---|---|
| 343 | A1 | Single Sheet | 1% hydrofluoric acid | 20 | 60 | 300 | 350 | Inert gas | B | |
| 344 | A1 | Single Sheet | 1% hydrofluoric acid | 20 | 60 | 150 | 500 | Inert gas | B | |
| 345 | A1 | Single Sheet | 1% hydrofluoric acid | 20 | 60 | 450 | 500 | Inert gas | B | |
| 346 | B1 | Single Sheet | None | | | None | | Inert gas | B | |
| 347 | B2 | Single Sheet | None | | | None | | Inert gas | B | |
| 348 | B3 | Single Sheet | None | | | None | | Inert gas | B | |
| 349 | B5 | Single Sheet | None | | | None | | Inert gas | B | |
| 350 | B6 | Single Sheet | None | | | None | | Inert gas | B | |
| 351 | B7 | Single Sheet | None | | | None | | Inert gas | B | |
| 352 | B8 | Single Sheet | None | | | None | | Inert gas | B | |
| 353 | B9 | Single Sheet | None | | | None | | Inert gas | B | |
| 354 | B10 | Single Sheet | None | | | None | | Inert gas | B | |
| 355 | B11 | Single Sheet | None | | | None | | Inert gas | B | |
| 356 | B12 | Single Sheet | None | | | None | | Inert gas | B | |
| 357 | B13 | Single Sheet | None | | | None | | Inert gas | B | |
| 358 | B14 | Single Sheet | None | | | None | | Inert gas | B | |
| 359 | B15 | Single Sheet | None | | | None | | Inert gas | B | |
| 360 | B16 | Single Sheet | None | | | None | | Inert gas | B | |
| 361 | B17 | Single Sheet | None | | | None | | Inert gas | B | |
| 362 | B18 | Single Sheet | None | | | None | | Inert gas | B | |
| 363 | B20 | Single Sheet | None | | | None | | Inert gas | B | |
| 364 | B21 | Single Sheet | None | | | None | | Inert gas | B | |
| 365 | B22 | Single Sheet | None | | | None | | Inert gas | B | |
| 366 | B23 | Single Sheet | None | | | None | | Inert gas | B | |
| 367 | B24 | Single Sheet | None | | | None | | Inert gas | B | |
| 368 | B25 | Single Sheet | None | | | None | | Inert gas | B | |
| 369 | B26 | Single Sheet | None | | | None | | Inert gas | C | |
| 370 | B27 | Single Sheet | None | | | None | | Inert gas | C | |
| 371 | B28 | Single Sheet | None | | | None | | Inert gas | C | Judged on the sacrificial side Pitting corrosion occurred |
| 372 | B29 | Single Sheet | None | | | None | | Inert gas | C | Judged on the sacrificial side Large amount of corrosion |
| 373 | B30 | Mini-core | None | | | None | | Inert gas | B | |
| 374 | B31 | Mini-core | None | | | None | | Inert gas | — | Not yet evaluated because of fin buckling |
| 375 | B32 | Mini-core | None | | | None | | Inert gas | C | Corroded through |
| 376 | B33 | Mini-core | None | | | None | | Inert gas | C | Corroded through |

As shown in Table 14, corrosion resistance was satisfactory for all of Test Materials A1-A38. In particular, with regard to Test Materials A25, A26, in which Zn was added to the filler material in the above-mentioned specified range, corrosion due to a drop in the electric potential of the filler material advanced in layers at the interface between the core material and the filler material and excellent corrosion resistance was exhibited (Test Nos. 329, 330). In addition, Test Materials A28, A29, in which the sacrificial anode material was provided on the core material, exhibited excellent corrosion resistance (Test Nos. 332, 333) owing to the sacrificial corrosion-protection effect. With regard to Test Materials A32-A38, in which Zn, In, or Sn was added to the core material in the above-mentioned specified ranges, corrosion of the flat sheets 42 (refer to FIG. 5) was inhibited owing to the sacrificial corrosion-protection effect of the core material and excellent corrosion resistance was exhibited (Test Nos. 336-342).

On the other hand, as shown in Table 15, with regard to Test Materials B26, B27, in which the amounts of Zn and Cu in the filler material were above the above-mentioned specified ranges, corrosion was instead promoted owing to the excessive rise or fall of the electric potential of the filler material, which led to a degradation in corrosion resistance (Test Nos. 369, 370).

With regard to Test Material B28, in which the amount of Zn in the sacrificial anode material was below the above-mentioned specified range, the sacrificial corrosion-protection effect was insufficient, which led to a degradation in corrosion resistance (Test No. 371).

With regard to Test Material B29, in which the amount of Zn in the sacrificial anode material was above the above-mentioned specified range, the electric potential of the sacrificial anode material became excessively low, which led to a degradation in corrosion resistance (Test No 372).

With regard to Test Materials B32, B33, in which the amount of In or Sn in the core material was above the above-mentioned specified ranges, corrosion was promoted owing to the excessive drop in the electric potential of the core material. Thereby, the corrugated fin 41 came off of the mini-core 4 at an early stage, which was caused by a degradation in corrosion resistance (Test Nos. 375, 376).

The invention claimed is:

1. A brazing sheet that is usable in brazing performed in an inert gas atmosphere or in a vacuum without using a flux, comprising:
   a core material having a chemical composition that contains Mg: 0.20 mass % or more and 1.3 mass % or less, the remainder being Al and unavoidable impurities; and
   a filler material layered on the core material and having a chemical composition that contains Si: 6.0 mass % or more and 13.0 mass % or less, Bi: 0.0040 mass % or more and 0.070 mass % or less, and Mg: 0.050 mass % or more and less than 0.10 mass %, the remainder being Al and unavoidable impurities.

2. The brazing sheet according to claim 1, wherein the core material further contains one or two or more elements selected from the group consisting of: Mn: 0.30 mass % or more and 2.0 mass % or less, Si: 0.30 mass % or more and 1.0 mass % or less, Fe: less than 1.0 mass %, Cu: 1.0 mass % or less, Ti: less than 0.10 mass %, Zr: less than 0.30 mass %, and Cr: less than 0.30 mass %.

3. The brazing sheet according to claim 1, wherein the Mg content in the core material is less than 1.0 mass %.

4. The brazing sheet according to claim 3, wherein the Bi content in the filler material is less than 0.030 mass %.

5. The brazing sheet according to claim 1, wherein the filler material further contains one or two or more elements selected from the group consisting of: Sb: 0.0070 mass % or more and 0.050 mass % or less, Pb: 0.0040 mass % or more and 0.070 mass % or less, Ba: 0.0040 mass % or more and 0.070 mass % or less, Na: 0.0020 mass % or more and 0.020 mass % or less, and Sr: 0.0020 mass % or more and 0.050 mass % or less.

6. The brazing sheet according to claim 1, wherein the filler material further contains one or two or more elements selected from the group consisting of: Fe: 0.050 mass % or more and 0.80 mass % or less, Mn: 0.050 mass % or more and 0.20 mass % or less, and Ti: 0.010 mass % or more and 0.15 mass % or less.

7. The brazing sheet according to claim 1, wherein the filler material further contains Zn: 0.050 mass % or more and 3.0 mass % or less.

8. The brazing sheet according to claim 1, wherein the filler material further contains Cu: 0.020 mass % or more and 1.0 mass % or less.

9. The brazing sheet according to claim 1, wherein the core material further contains one or two or more elements selected from the group consisting of: Zn: 0.10 mass % or more and 3.0 mass % or less, In: 0.010 mass % or more and 0.10 mass % or less, and Sn: 0.010 mass % or more and 0.10 mass % or less.

10. The brazing sheet according to claim 1, wherein:
    the brazing sheet comprises the core material, the filler material, which is layered on a first sheet surface of the core material, and a sacrificial anode material, which is layered on a second sheet surface of the core material that is opposite of the first sheet surface; and
    the sacrificial anode material has a chemical composition that contains one or two or more elements selected from the group consisting of: Zn: 0.90 mass % or more and 6.0 mass % or less, In: 0.010 mass % or more and 0.10 mass % or less, and Sn: 0.010 mass % or more and 0.10 mass % or less, the remainder being Al and unavoidable impurities.

11. A method of manufacturing the brazing sheet according to claim 1, comprising:
    preparing a clad sheet provided with the layered structure according to claim 1; and
    removing an oxide film present on a surface of the clad sheet by etching the clad sheet with an acid or an alkali.

12. The method of manufacturing the brazing sheet according to claim 11, comprising:
    after the etching has been performed, applying 500 mg/cm$^2$ or more of a protective oil, which has a decomposition temperature that is 200-380° C. in an inert gas atmosphere, to a surface of the brazing sheet.

13. The brazing sheet according to claim 1, wherein the Mg content in the filler material is 0.051-0.079 mass %.

14. The brazing sheet according to claim 13, wherein the Bi content in the filler material is 0.004-0.023 mass %.

15. The brazing sheet according to claim 14, wherein the Mg content in the filler material is 0.072-0.079 mass %.

16. The brazing sheet according to claim 15, wherein the Bi content in the filler material is 0.018-0.023 mass %.

17. A brazing sheet, comprising:
    a core composed of an aluminum alloy containing 0.20-1.3 mass % Mg; and
    a filler layered on the core and being composed of an aluminum alloy containing Si: 6.0-13.0 mass % Si, 0.0040-0.070 mass % Bi, and 0.051-0.10 mass % Mg.

18. The brazing sheet according to claim 17, wherein:
the Mg content in the filler material is 0.072-0.079 mass % and
the Bi content in the filler material is 0.018-0.023 mass %.

19. The brazing sheet according to claim 18, wherein the filler material further contains one or two or more elements selected from the group consisting of:
Sb: 0.0070-0.050 mass %,
Pb: 0.0040-0.070 mass %,
Ba: 0.0040-0.070 mass %,
Na: 0.0020-0.020 mass %, and
Sr: 0.0020-0.050 mass %.

20. The brazing sheet according to claim 18, further comprising:
a sacrificial anode material layered on a surface of the core that is opposite of the filler;
wherein the sacrificial anode material is composed of an aluminum alloy containing one or two or more elements selected from the group consisting of:
Zn: 0.90-6.0 mass %,
In: 0.010-0.10 mass %, and
Sn: 0.010-0.10 mass %.

* * * * *